(12) United States Patent
Lu et al.

(10) Patent No.: US 12,211,460 B2
(45) Date of Patent: Jan. 28, 2025

(54) DRIVER BOARD, DISPLAY PANEL, AND DISPLAY APPARATUS

(71) Applicant: Shanghai Tianma Micro-Electronics Co., Ltd., Shanghai (CN)

(72) Inventors: Haotian Lu, Shanghai (CN); Linzhi Wang, Shanghai (CN); Baiquan Lin, Shanghai (CN); Zhen Liu, Shanghai (CN); Kerui Xi, Shanghai (CN); Kaidi Zhang, Shanghai (CN); Yifan Xing, Shanghai (CN); Xin Xu, Shanghai (CN); Huijun Jin, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 18/408,053

(22) Filed: Jan. 9, 2024

(65) Prior Publication Data

US 2024/0144891 A1 May 2, 2024

(30) Foreign Application Priority Data

Aug. 18, 2023 (CN) .......................... 202311047386.7

(51) Int. Cl.
*G09G 5/00* (2006.01)
*G02F 1/167* (2019.01)
(Continued)

(52) U.S. Cl.
CPC .............. *G09G 3/344* (2013.01); *G02F 1/167* (2013.01); *G02F 1/1685* (2019.01);
(Continued)

(58) Field of Classification Search
CPC .................. G09G 3/344; G09G 3/3446; G09G 2300/0426; G09G 2300/0842;
(Continued)

(56) References Cited

U.S. PATENT DOCUMENTS 6,778,162 B2 * 8/2004 Kimura ................ G09G 3/3659
345/55
8,139,011 B2 * 3/2012 Ishii ..................... G09G 3/3655
349/94

(Continued)

FOREIGN PATENT DOCUMENTS

CN 101916017 A * 12/2010
CN 103454823 A * 12/2013 ......... G02F 1/13306
(Continued)

OTHER PUBLICATIONS

Translation of CN101916017A.*
Translation of CN 103389604B.*
Translation of CN103454823A.*

*Primary Examiner* — Joe H Cheng
(74) *Attorney, Agent, or Firm* — Christensen O'Connor Johnson Kindness PLLC

(57) ABSTRACT

Provided are a driver board, a display panel, and a display apparatus. The driver board includes a driver circuit. The driver circuit includes N pixel electrodes, N pixel switches, a data switch, and a storage capacitor, N is a positive integer, and N≥2. The storage capacitor includes a reference electrode and a counter electrode. A control terminal of the pixel switch receives a gating signal, a first terminal of the pixel switch is connected to the counter electrode, and a second terminal of the pixel switch is connected to the pixel electrode. The driver board further includes data lines, and each data line is connected to the counter electrode via the data switch.

20 Claims, 11 Drawing Sheets

(51) Int. Cl.
*G02F 1/1685* (2019.01)
*G09G 3/34* (2006.01)

(52) U.S. Cl.
CPC .............. *G09G 2300/0426* (2013.01); *G09G 2300/0842* (2013.01); *G09G 2310/0262* (2013.01); *G09G 2310/08* (2013.01)

(58) Field of Classification Search
CPC ........ G09G 2310/0262; G09G 2310/08; G02F 1/167; G02F 1/185; G02F 1/13624; G02F 1/136286; G02F 1/16757; G02F 1/1676; G02F 1/16766; G02F 1/1681
See application file for complete search history.

(56) References Cited

U.S. PATENT DOCUMENTS

| | | | | |
|---|---|---|---|---|
| 10,585,320 B2* | 3/2020 | Xu | ........................ | G02F 1/1368 |
| 2010/0013789 A1* | 1/2010 | Chung | .................. | G06F 3/0412 |
| | | | | 349/48 |
| 2013/0147783 A1* | 6/2013 | Yamauchi | ............ | H01L 27/1255 |
| | | | | 345/212 |
| 2015/0002497 A1* | 1/2015 | Dong | .................. | G09G 3/3655 |
| | | | | 345/87 |
| 2020/0184893 A1* | 6/2020 | Dong | .................. | G09G 3/3233 |
| 2021/0335260 A1* | 10/2021 | Wang | .................. | G09G 3/3258 |

FOREIGN PATENT DOCUMENTS

| | | | | | |
|---|---|---|---|---|---|
| CN | 103389604 B | * | 11/2015 | .......... | G02F 1/1362 |
| CN | 113451375 A | | 9/2021 | | |

\* cited by examiner

DRIVER BOARD, DISPLAY PANEL, AND DISPLAY APPARATUS

CROSS-REFERENCE TO RELATED DISCLOSURE

The present disclosure claims priority to Chinese Patent Application No. 202311047386.7, filed on Aug. 18, 2023, the content of which is incorporated herein by reference in its entirety.

TECHNICAL FIELD

The present disclosure relates to the technical field of displays, and in particular, to a driver board, a display panel, and a display apparatus.

BACKGROUND

At present, electronic paper products are widely used in the consumer market, including smart labels, e-readers, advertising billboards, and other fields. Currently, most electronic paper products display black-and-white images, with few commercially available color e-paper products. Compared with black-and-white electronic paper, a primary pixel of the color electronic paper includes three or four pixels, which seriously affects the resolution if the pixel size remains unchanged. However, it is difficult to miniaturize the size of individual pixels based on the current driver board, which limits the development of color electronic paper products.

SUMMARY

Embodiments of the present disclosure provide a driver board, a display panel, and a display apparatus.

According to one aspect of the embodiments of the present disclosure, a driver board is provided. The driver board includes a driver circuit. The driver circuit includes N pixel electrodes and a storage capacitor, where N is a positive integer and N≥2. The storage capacitor includes a reference electrode and a counter electrode that overlap with each other.

The driver circuit further includes N pixel switches and a data switch, a control terminal of the pixel switch receives a gating signal, a first terminal of the pixel switch is connected to the counter electrode, and a second terminal of the pixel switch is connected to the corresponding pixel electrode.

The driver board further includes data lines. The counter electrode of the driver circuit is connected to one of the data lines via the data switch.

According to another aspect of the embodiments of the present disclosure, a display panel is provided. The display panel includes a driver board including a driver circuit. The driver circuit includes N pixel electrodes and a storage capacitor, where N is a positive integer and N≥2. The storage capacitor includes a reference electrode and a counter electrode that overlap with each other. The driver circuit further includes N pixel switches and a data switch, a control terminal of the pixel switch receives a gating signal, a first terminal of the pixel switch is connected to the counter electrode, and a second terminal of the pixel switch is connected to the corresponding pixel electrode. The driver board further includes data lines. The counter electrode of the driver circuit is connected to one of the data lines via the data switch.

According to yet another aspect of the embodiments of the present disclosure, a display apparatus is provided. The display apparatus includes a display panel, and the display panel includes a driver board. The driver board includes a driver circuit. The driver circuit includes N pixel electrodes and a storage capacitor, where N is a positive integer and N≥2. The storage capacitor includes a reference electrode and a counter electrode that overlap with each other. The driver circuit further includes N pixel switches and a data switch, a control terminal of the pixel switch receives a gating signal, a first terminal of the pixel switch is connected to the counter electrode, and a second terminal of the pixel switch is connected to the corresponding pixel electrode. The driver board further includes data lines. The counter electrode of the driver circuit is connected to one of the data lines via the data switch.

DRAWINGS

To describe the technical solutions in the embodiments of the present disclosure more clearly, the following briefly describes the accompanying drawings required for describing the embodiments. Apparently, the accompanying drawings in the following description show some embodiments of the present disclosure, and a person skilled in the art may still derive other drawings from these accompanying drawings without creative efforts.

DETAILED DESCRIPTION OF THE EMBODIMENTS

To make the objectives, technical solutions, and advantages of the embodiments of the present disclosure clearer, the technical solutions in the embodiments of the present disclosure will be clearly and completely described below with reference to the accompanying drawings in the embodiments of the present disclosure. Apparently, the described embodiments are some rather than all of the embodiments of the present disclosure. All other embodiments obtained by those of ordinary skill in the art based on the embodiments of the present disclosure without creative efforts should fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

Electronic paper products have certain requirements for a storage capacitor of a pixel. If the storage capacitor is too small, its retention ability within one frame is insufficient, leading to insufficient driving of electrophoretic particles and causing uneven display. One of the main factors affecting the capacitance value of the storage capacitor in electronic paper products is the overlapping area of two plates of the storage capacitor. The overlapping area of the two plates directly affects the pixel size. In addition, electronic paper products require high voltages to drive the electrophoretic particles, so the transistor in the driver circuit needs to have a certain width-to-length ratio. This is one of the limits on the reduction in pixel sizes in electronic paper products.

Embodiments of the present disclosure provide a driver board. Pixel electrodes in a driver circuit share one storage capacitor, which allows for the reduction of the size of the pixel electrode while maintaining a sufficiently large capacitance value for the storage capacitor. This ensures efficient driving of electrophoretic particles and prevents uneven display when applied in electronic paper products. In addition, since the pixel electrodes share the same storage capacitor, each pixel electrode has sufficient space for arranging the pixel switch, therefore meeting the size requirement of the pixel switch. The pixel switch can withstand a high voltage, so the off-state leakage current of the pixel switch is reduced and the voltage on the pixel electrode is stabilized. According to the present disclosure, the pixel size can be miniaturized, meeting the requirements of color electronic paper products on Pixels Per Inch (PPI).

Figure 1:
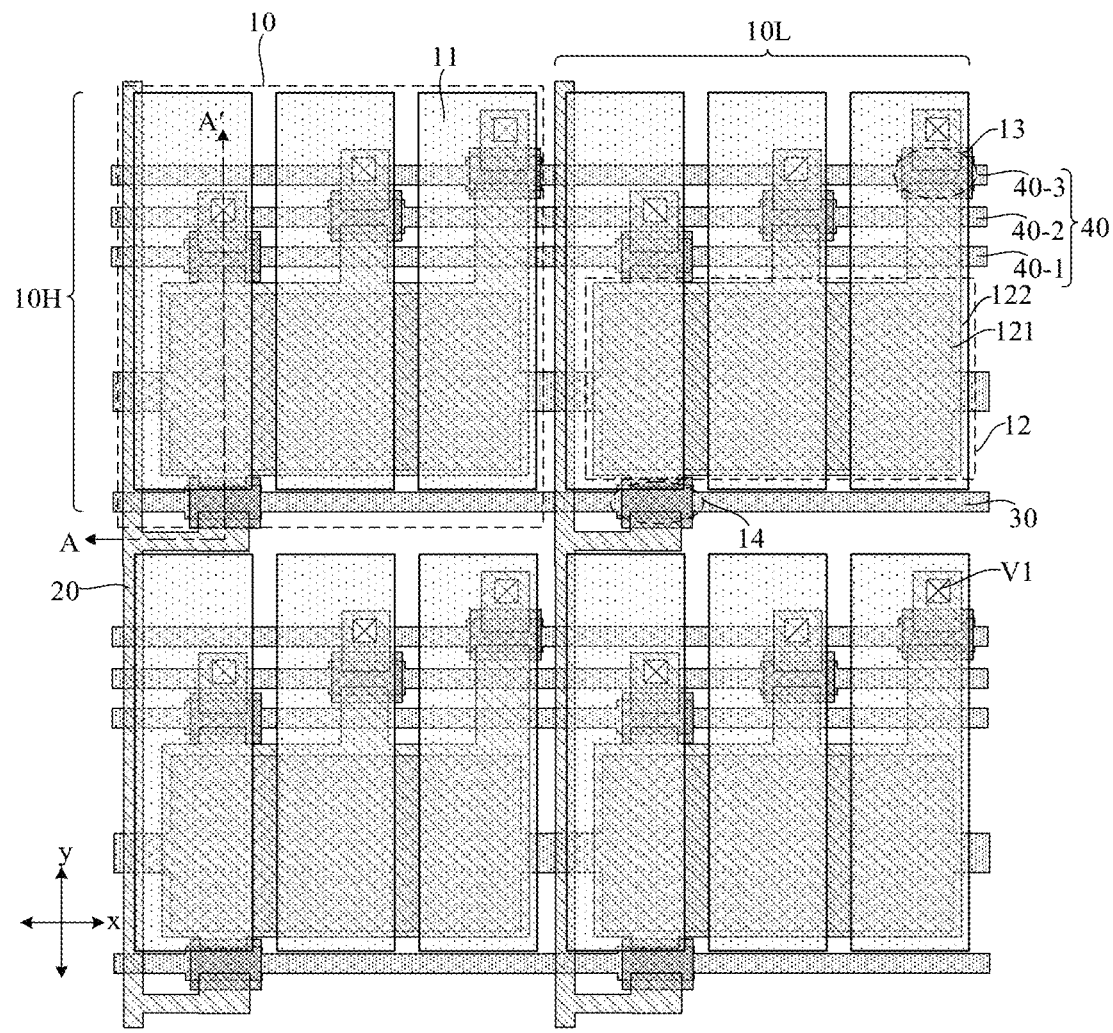
FIG. 1 is a partial schematic diagram of a driver board according to an embodiment of the present disclosure.
Figure 2:
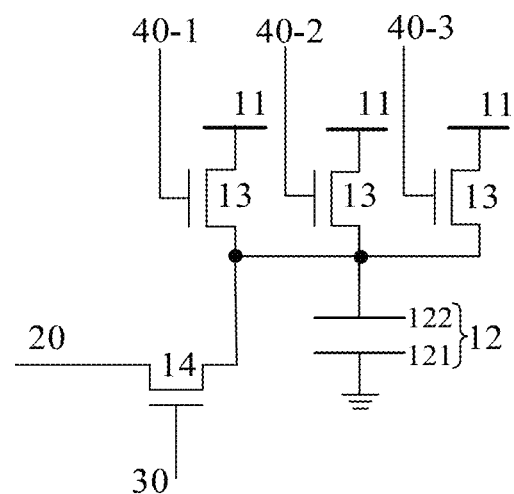
FIG. 2 is a schematic circuit diagram of a driver circuit in a driver board according to an embodiment of the present disclosure.

FIG. 1 is a partial schematic diagram of a driver board according to an embodiment of the present disclosure, and FIG. 2 is a schematic circuit diagram of a driver circuit in the driver board according to an embodiment of the present disclosure.

As shown in FIG. 1, the driver board includes a plurality of driver circuits 10. One or more of the driver circuits 10 each include N pixel electrodes 11 and one storage capacitor 12. N is a positive integer and N≥2. The N pixel electrodes 11 in the driver circuit 10 share one storage capacitor 12. The storage capacitor 12 includes a reference electrode 121 and a counter electrode 122 that are overlapped with each other. In FIG. 1, N=3 is used for illustration.

Referring to FIG. 2, each driver circuit 10 further includes a data switch 14 and N pixel switches 13, and a control terminal of each pixel switch 13 receives a gating signal. The gating signal is provided by a gating signal line 40. Control terminals of the three pixel switches 13 shown in FIG. 2 are respectively connected to a first gating signal line 40-1, a second gating signal line 40-2, and a third gating signal line 40-3. A first terminal of each pixel switch 13 is connected to the counter electrode 122 of the storage capacitor 12, and a second terminal of each pixel switch 13 is connected to one of the pixel electrodes 11. The reference electrode 121 of the storage capacitor 12 may be grounded. That is, the N pixel electrodes 11 are connected to the storage capacitor 12 via the pixel switches 13 respectively, and the N pixel electrodes 11 in the driver circuit 10 share one storage capacitor 12.

The driver board includes data lines 20 and data control lines 30. The data lines 20 are connected to the counter electrodes 122 via the data switches 14. Control terminals of the data switches 14 are connected to the data control lines 30.

In FIG. 1, both the pixel switch 13 and the data switch 14 are illustrated as single-gate transistors. In some embodiments, at least one of the pixel switch 13 and the data switch 14 is a double-gate transistor. This can reduce the off-state leakage current of the transistor. For example, the pixel switch 13 is a double-gate transistor, which reduces the off-state leakage current of the pixel switch 13 and improves the voltage stability on the pixel electrode. In addition, the transistor types of the pixel switch 13 and the data switch 14 are not limited by the illustrated embodiments of the present disclosure, and the pixel switch 13 and the data switch 14 each may be an N-type transistor or a P-type transistor.

In the driver board provided in embodiments of the present disclosure, the driver circuit 10 includes N pixel electrodes 11, and the N pixel electrodes 11 in the driver circuit 10 share one storage capacitor 12, such that the quantity of storage capacitors 12 in the driver board is reduced when the quantity of pixel electrodes 11 is kept unchanged. Even when the size of the pixel electrode 11 is reduced, there is sufficient space to arrange a large-sized storage capacitor 12, ensuring that the capacitance value of the storage capacitor 12 is sufficiently large. This allows meeting the requirements on the capacitance value of the storage capacitor 12 when applied in electronic paper products. The pixel electrodes 11 can be fully charged using the storage capacitor, thereby avoiding voltage drops of the pixel electrodes 11 caused by leakage or gate-source capacitive coupling of the transistor switch. This ensures efficient driving of electrophoretic particles and prevents uneven display. In addition, since the N pixel electrodes 11 share the same storage capacitor 12, each pixel electrode 11 has sufficient space to accommodate the pixel switch 13. This ensures that the pixel switch 13 can meet the size requirements. Therefore, the pixel switch can withstand a high voltage, the off-state leakage current of the pixel switch is reduced, and the voltage on the pixel electrode is stabilized. When the driver board provided in the embodiments of the present disclosure is applied to electronic paper products, the pixel size can be miniaturized, especially meeting the requirements of color electronic paper products on PPI.

In some embodiments, the driver board may be used as the driver backplane of the electronic paper product. The pixel electrode 11 on the driver board and a common electrode on a counter substrate form an electric field to drive electrophoretic particles to move. Each pixel in the electronic paper product includes one pixel electrode 11.

Figure 3:
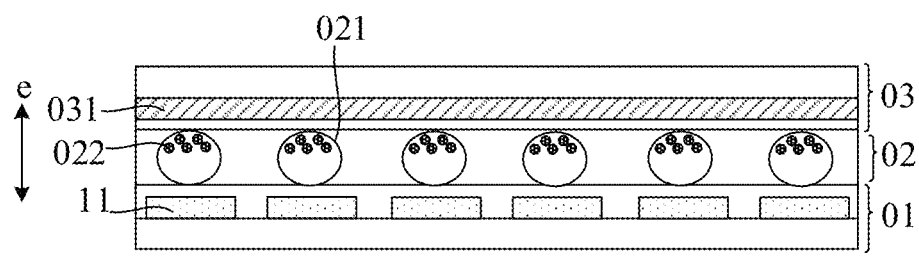
FIG. 3 is a schematic diagram of a display panel according to an embodiment of the present invention.

In some embodiments, the display panel adopts the microcapsule electrophoretic display technology. FIG. 3 is a schematic diagram of a display panel according to an embodiment of the present disclosure. As shown in FIG. 3, the display panel includes a driver board 01, an electrophoretic film 02, and a counter substrate 03. The electrophoretic film 02 includes microcapsules 021, in each of which electrophoretic particles 022 and electrophoretic liquid are provided. The electrophoretic film 02 is a display medium between the driver board 01 and the counter substrate 03. The counter substrate 03 further includes a common electrode 031, and the common electrode 031 overlaps the pixel electrode 11 in a thickness direction e of the display panel. The structure of the driver board 01 in FIG. 3 is shown in merely a simplified manner. The driver board 01, the electrophoretic film 02, and the counter substrate 03 are separately fabricated. Then, the driver board 01 and the electrophoretic film 02 are bonded using an adhesive layer, and the electrophoretic film 02 and the counter substrate 03 are also bonded using an adhesive layer. Alternatively, the electrophoretic film 02 may be fabricated on the counter substrate 03, and then the electrophoretic film 02 and the counter substrate 03 as a whole are bonded with the driver board 01. The common electrode 031 on the counter substrate 03 may be electrically connected to the driver board 01, such that the driver board 01 can supply a driving voltage to the common electrode 031.

Figure 4:
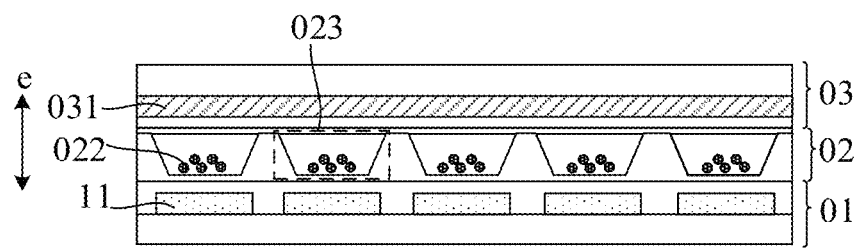
FIG. 4 is a schematic diagram of another display panel according to an embodiment of the present disclosure.

In other embodiments, the display panel adopts the microcup electrophoretic display technology. FIG. 4 is a schematic diagram of another display panel according to an embodiment of the present disclosure. As shown in FIG. 4, the display panel includes a driver board 01, an electrophoretic film 02, and a counter substrate 03. The electrophoretic film 02 includes a plurality of microcups 023, each including electrophoretic particles 022 and electrophoretic liquid. The electrophoretic film 02 is a display medium between the driver board 01 and the counter substrate 03. FIG. 4 schematically shows a common electrode 031 on the counter substrate 03 and pixel electrodes 11 on the driver board 01. In this embodiment, the electrophoretic film 02 may be separately fabricated, and then bonded to the driver board 01 and the counter substrate 03 separately using adhesive layers. Alternatively, the electrophoretic film 02 may be fabricated on the counter substrate 03, and then the electrophoretic film 02 and the counter substrate 03 as a whole are bonded with the driver board 01. The common electrode 031 on the counter substrate 03 may be electrically connected to the driver board 01, such that the driver board 01 can supply a driving voltage to the common electrode 031.

Figure 5:
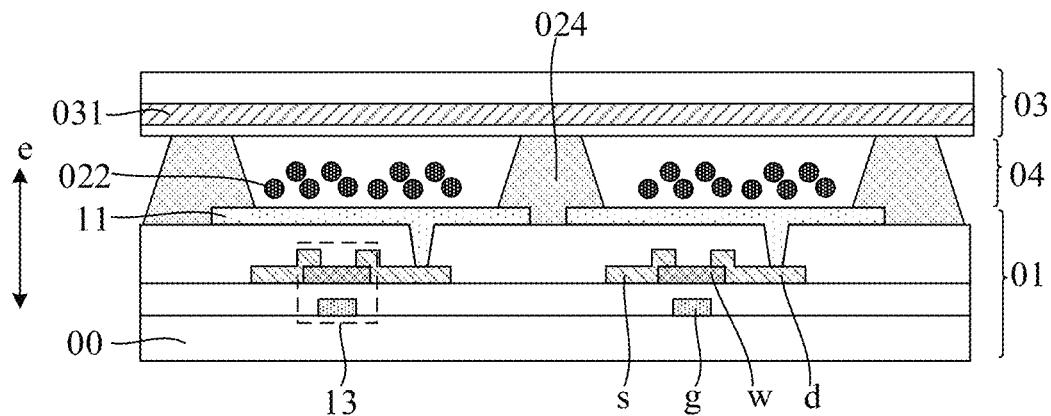
FIG. 5 is a schematic diagram of another display panel according to an embodiment of the present disclosure.

In other embodiments, the display panel adopts the cofferdam electrophoretic display technology. FIG. 5 is a schematic diagram of another display panel according to an embodiment of the present disclosure. As shown in FIG. 5, the display panel includes a driver board 01 and a counter substrate 03. After the driver circuits are fabricated on the driver board 01, a plurality of cofferdam structures 024 are fabricated on the driver circuits. The cofferdam structures 024 surround the pixel regions respectively. The cofferdam structures 024 define micro cavities. Electrophoretic particles 022 and electrophoretic liquid are arranged in the cofferdam structures 024, and then encapsulated. The cofferdam structures 024, the electrophoretic particles 022, and the electrophoretic liquid constitute a display medium layer 04 between the driver board 01 and the counter substrate 03. FIG. 5 schematically shows a substrate 00, a pixel switch 13, and a pixel electrode 11. The pixel switch 13 includes a gate g, an active layer W, a source s, and a drain d, and the pixel electrode 11 is electrically connected to the drain d. FIG. 5 shows the pixel switch 13 as a bottom-gate transistor, and the pixel switch 13 may alternatively be a top-gate transistor. In a thickness direction e of the display panel, the common electrode 031 on the counter substrate 03 overlaps with the pixel electrode 11 on the driver board 01.

Figure 6:
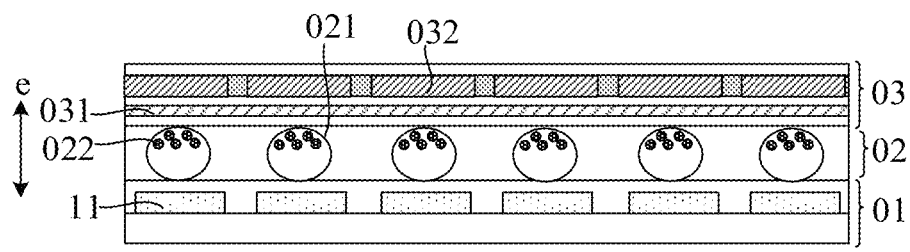
FIG. 6 is a schematic diagram of another display panel according to an embodiment of the present disclosure.

In some embodiments, the microcapsule electrophoretic display technology is used as an example. FIG. 6 is a schematic diagram of another display panel according to an embodiment of the present disclosure. As shown in FIG. 6, the counter substrate 03 further includes a color filter layer including at least three color filter units 032 with different colors. In the thickness direction e of the display panel, the color filter unit 032 overlaps with the pixel electrode 11. With the color filter layer, color display is achieved. Optionally, the N pixel electrodes 11 overlap with N color filter units in the driver circuit, and the N color filter units have different colors.

The driver board provided in embodiments of the present disclosure is used for driving the display panel to display. Displaying of an image includes N refresh cycles, and data voltages are written into the N pixel electrodes 11 in the N refresh cycles respectively. In each refresh cycle, the data switch 14 is turned on to connect the data line 20 to the counter electrode 122, the pixel switch 13 corresponding to the refresh cycle is turned on to connect the pixel electrode 11 corresponding to the refresh cycle to the counter electrode 122. The data line 20 writes the data voltage corresponding to the refresh cycle into the pixel electrode 11 corresponding to the refresh cycle and stores the data voltage in the storage capacitor 12. During the period when the pixel switch 13 is turned on, the storage capacitor 12 can be used to maintain the voltage on the pixel electrode 11. Because the capacitance value of the storage capacitor 12 is large enough, the pixel electrode 11 can be fully charged, thereby avoiding voltage drop of the pixel electrode 11 caused by current leakage and gate-source capacitive coupling. This ensures efficient driving of electrophoretic particles. For each driver circuit 10, during each refresh cycle, the data voltage is written into to the corresponding pixel electrode 11 by turning on the data switch 14 and the corresponding pixel switch 13. In the N refresh cycles, data voltages are respectively written into the N pixel electrodes 11 in the driver circuit 10. All the N pixel electrodes 11 participate in the display process, and the driver board performs driving of display of a complete image through N refresh cycles.

In some embodiments, the data voltage ranges between −15V and 15V.

In an embodiment, for example, N=3. Referring to FIG. 6, the driver board is applied to a display panel, each driver circuit 10 includes three pixel electrodes 11, and each pixel electrode 11 overlaps with one color filter unit 032. The colors of the three color filter units 032 overlapping with the three pixel electrodes 11 in the driver circuit are different, for example, the three pixel electrodes 11 respectively overlap with red, green, and blue color filter units 032. Each pixel in the display panel includes the color filter unit 032, the pixel electrode 11, and the pixel switch 13. In this case, the red pixel in the display panel includes the red color filter unit and the pixel electrode 11 overlapping with the red color filter unit, the green pixel includes the green color filter unit and the pixel electrode 11 overlapping with the green color filter unit, and the blue pixel includes the blue color filter unit and the pixel electrode 11 overlapping with the blue color filter unit. The display panel may display an image in the following ways.

The display panel displays an image through the driving of three refresh cycles, and the red, green, and blue pixels are respectively driven in the three refresh cycles.

Figure 7:
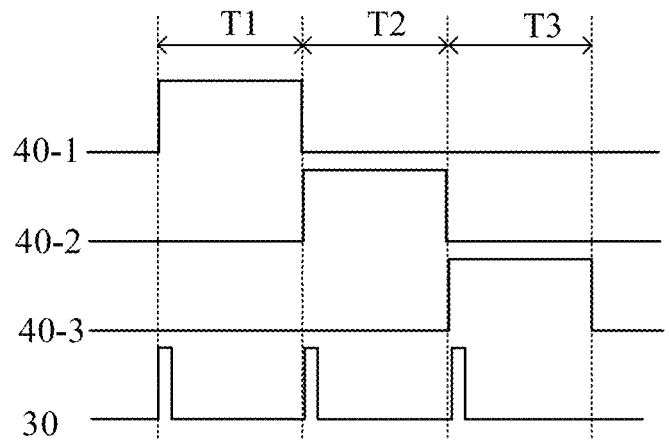
FIG. 7 is a drive timing diagram according to an embodiment of the present disclosure.

FIG. 7 is a drive timing diagram according to an embodiment of the present disclosure. Description is made with reference to the circuit diagram of the driver circuit shown in FIG. 2. In FIG. 7, the timing 30 represents the signal timing of a data control line 30 in the driver board. In an embodiment, the pixel switch 13 connected to the first gating signal line 40-1 is included the red pixel, the pixel switch 13 connected to the second gating signal line 40-2 is included the green pixel, and the pixel switch 13 connected to the third gating signal line 40-3 is included the blue pixel. The data control line 30 controls the data switch 14, and the data control line 30 provides an enable signal to turn on the data switch 14. As shown in FIG. 7, the three refresh cycles include a first refresh cycle T1, a second refresh cycle T2, and a third refresh cycle T3.

In the first refresh cycle T1, the pixel switch 13 in the red pixel is turned on to connect the pixel electrode 11 in the red pixel to the counter electrode 122, and the data switch 14 is turned on to connect the data line 20 to the counter electrode 122. The data line 20 writes a data voltage corresponding to the red pixel into the pixel electrode 11. During the period when the pixel switch 13 is turned on, the storage capacitor 12 makes the voltage on the pixel electrode 11 stable, avoiding voltage drop on the pixel electrode 11. In the red pixel, an electric field is formed between the pixel electrode 11 and the common electrode 031 to control the electrophoretic particles in the red pixel to move to the desired position, so as to realize grayscale display of the red pixel. Due to the bi-stable characteristics of the electrophoretic particles, after the pixel switch 13 is turned off, the electrophoretic particles remain at the current position and do not move, such that the red pixel maintains its display state. In this refresh cycle, all the driver circuits 10 work and charge the pixel electrodes 11 of all the red pixels, such that all the red pixels display their desired grayscales. And the red pixels maintain the display state after the first refresh cycle.

In the second refresh cycle T2, the pixel switch 13 in the green pixel is turned on to connect the pixel electrode 11 in the green pixel to the counter electrode 122, and the data switch 14 is turned on to connect the data line 20 to the counter electrode 122. The data line 20 writes a data voltage corresponding to the green pixel into the pixel electrode 11 in the green pixel. During the period when the pixel switch 13 is turned on, the storage capacitor 12 makes the voltage on the pixel electrode 11 stable. In the green pixel, an electric field is formed between the pixel electrode 11 and the common electrode 031 to control the electrophoretic particles in the green pixel to move to the desired position, so as to realize grayscale display of the green pixel. After the pixel switch 13 is turned off, the green pixel maintains its display state. In this refresh cycle, all the driver circuits 10 work and charge the pixel electrodes 11 of all the green pixels, such that all the green pixels display their desired grayscales. The green pixel maintains the display state after the second refresh cycle, and the red pixel maintains the display state during and after the second refresh cycle.

In the third refresh cycle T3, the pixel switch 13 in the blue pixel is turned on to connect the pixel electrode 11 in the blue pixel to the counter electrode 122, and the data switch 14 is turned on to connect the data line 20 to the counter electrode 122. The data line 20 writes a data voltage corresponding to the blue pixel into the pixel electrode 11 in the blue pixel. During the period when the pixel switch 13 is turned on, the storage capacitor 12 makes the voltage on the pixel electrode 11 stable. In the blue pixel, an electric field is formed between the pixel electrode 11 and the common electrode 031 to control the electrophoretic particles in the blue pixel to move to the desired position, so as to realize grayscale display of the blue pixel. After the pixel switch 13 is turned off, the blue pixel maintains its display state. In this refresh cycle, all the driver circuits 10 work and charge the pixel electrodes 11 of all the blue pixels, such that all the blue pixels display their desired grayscales. In the third refresh cycle, both the green pixel and the red pixel maintain the display state. After the third refresh cycle, the red, green, and blue pixels in the display panel all maintain the display state, and the three color pixels cooperate to display the image.

FIG. 7 illustrates an example embodiment that the first refresh cycle is for the red pixel, the second refresh cycle is for the green pixel, and the third refresh cycle is for the blue pixel. The embodiments of the present disclosure do not impose any limitations on the driving and display sequence of the red, green, and blue pixels within the three refresh cycles.

In the embodiments of the present disclosure, the N pixel electrodes 11 in the driver circuit 10 share one storage capacitor 12. With reference to the timing diagram of FIG. 7, it can be understood that in each refresh cycle, the data switch 14 is turned on once and the corresponding pixel switch 13 is turned on once, such that the data line 20 writes the data voltage to the corresponding pixel electrode 11, and the storage capacitor 12 is used to improve the voltage stability on the pixel electrode 11 and ensure full charging of the pixel electrode 11. When the driver board is applied to a display panel, after the pixel electrode 11 is charged, the pixel electrode 11 and the common electrode form an electric field to drive the electrophoretic particles to move, and the electrophoretic particles move to the desired position for displaying the pixel grayscale. When the pixel switch 13 connected to the pixel, electrode 11 is turned off, the electrophoretic particles still maintain their desired positions, and the grayscale displayed by the corresponding pixel remains unchanged. However, in some instances, there may be residual charges on the pixel electrode 11 even after the pixel switch 13 is turned off. These residual charges on the pixel electrode 11 may form an electric field with the common electrode (because the pixels in the display panel share the common electrode, and there is a continuous voltage signal on the common electrode during the display process). Consequently, this causes some electrophoretic particles in the pixel to be out of their desired positions, leading to disordered movement of some electrophoretic particles and resulting in abnormal pixel display.

Figure 8:
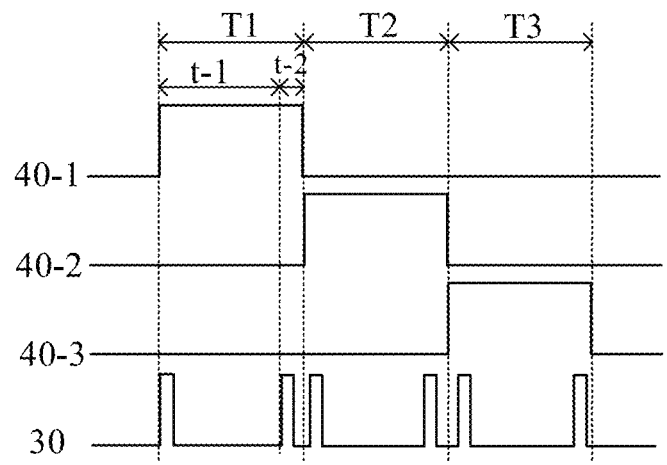
FIG. 8 is another drive timing diagram according to an embodiment of the present disclosure.

In the embodiments of the present disclosure, to avoid the disordered movement of the electrophoretic particles within the pixel during image display, a reset phase is added in the refresh cycle, and the drive timing is further improved. FIG. 8 is a schematic diagram of another drive timing diagram according to an embodiment of the present disclosure. Description is made with reference to the circuit diagram of the driver circuit shown in FIG. 2, for example, N=3. As shown in FIG. 8, in some embodiments, each refresh cycle includes a data writing phase t-1 and a reset phase t-2. In the data writing phase t-1, the data control line 30 provides an enable signal to turn on the data switch 14, and the data line 20 writes the data voltage into the pixel electrode 11. In the reset phase t-2, the data control line 30 provides the enable signal again to turn on the data switch 14, and the data line 20 writes a reset voltage into the pixel electrode 11. In each refresh cycle, the reset phase t-2 is subsequent to the data writing phase t-1. In this embodiment, the reset phase t-2 is added in the refresh cycle, and the pixel electrode 11 is reset by the reset voltage, to ensure that there is no voltage difference between the pixel electrode 11 and the common electrode after the refresh cycle ends and the pixel switch 13 is turned off, such that the electrophoretic particles within the pixel maintain at the position where they arrive when the pixel electrode 11 is charged. This ensures the target grayscale display and prevents disordered movement of the electrophoretic particles, thereby avoiding abnormal pixel display.

In some embodiments, the reset voltage is equal to the common voltage set in the display panel, for example, the reset voltage is 0 V.

In some embodiments, as shown in FIG. 1, the driver board further includes data control lines 30, the control terminal of the data switch 14 is connected to the corresponding data control line 30, the first terminal of the data switch 14 is connected to the corresponding data line 20, and the second terminal of the data switch 14 is connected to the counter electrode 122. The plurality of driver circuits 10 are arranged in an array including circuit rows 10H and circuit columns 10L. The circuit rows 10H extend along a first direction x and are arranged along a second direction y. The driver circuits 10 in the same circuit row 10H are arranged along the first direction x. The circuit columns 10L extend along the second direction y and are arranged along the first direction x. The driver circuits 10 in the same circuit column 10L are arranged along the second direction y. The first direction x crosses the second direction y. For example, the first direction x is perpendicular to the second direction y. Each data control line 30 is connected to the data switches 14 in one circuit row 10H, and each data line 20 is connected to the data switches 14 in one circuit column 10L. In this embodiment, the data switches 14 in one circuit row 10H are controlled by one data control line 30, the data control line 30 is equivalent to a row selecting line, and one data line 20 supplies data voltages to the driver circuits 10 in one circuit column 10L. The cooperation of the data control lines 30 and the data lines 20 can realize row-by-row drive of the plurality of circuit rows 10H to complete a refresh cycle.

Figure 9:
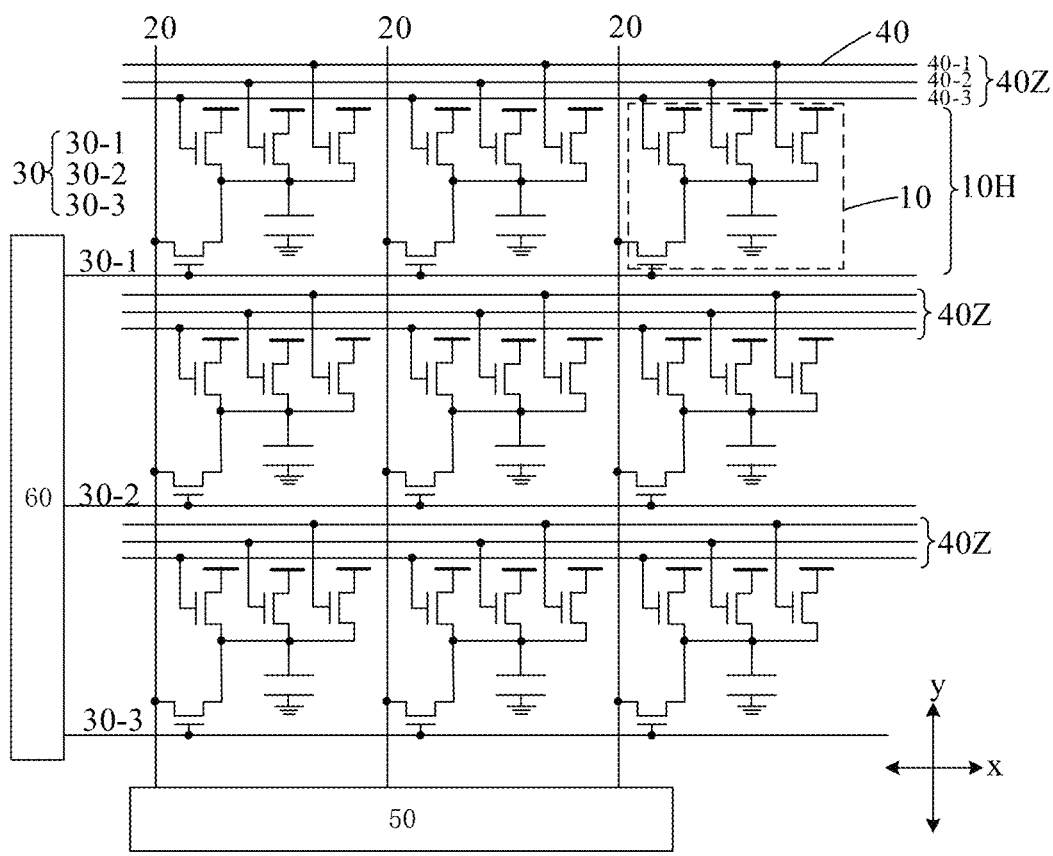
FIG. 9 is a schematic circuit diagram of another driver board according to an embodiment of the present disclosure.

FIG. 9 is a schematic circuit diagram of another driver board according to an embodiment of the present disclosure. As shown in FIG. 9, in some embodiments, the driver board further includes gating line groups 40Z, each gating line group 40Z includes N gating signal lines 40, and control terminals of N pixel switches 13 in the driver circuit are respectively connected to the N gating signal lines 40. For example, N=3. As shown in FIG. 9, the plurality of driver circuits 10 are arranged in circuit rows 10H along the first direction x. The driver circuits 10 in each circuit row 10H share one gating line group 40Z. The gating line group 40Z includes a first gating signal line 40-1, a second gating signal line 40-2, and a third gating signal line 40-3. In the example embodiment, N=3, the driver circuit 10 includes three pixel switches 13, and control terminals of the three pixel switches 13 are respectively connected to the three gating signal lines 40 in the gating line group 40Z corresponding to the circuit row where the driver circuit 10 is located. One gating line group 40Z drives one circuit row 10H, which can simplify the driving method of the circuit row 10H and simplify the layout in the driver board.

As shown in FIG. 9, the driver board includes a plurality of circuit rows 10H and a plurality of data control lines 30, and the data control lines 30 are arranged along the second direction y. FIG. 9 illustrates an example embodiment in which three circuit rows 10H, and a first data control line 30-1, a second data control line 30-2, and a third data control line 30-3 corresponding to the three circuit rows 10H, respectively. The data control lines 30 are connected to a row driving circuit 60, and the row driving circuit 60 provides enable signals to the data control lines 30 row by row in a refresh cycle. The row driving circuit 60 may be, for example, a shift driver circuit fabricated on the driver board or a driver chip bonded on the driver board. The data line 20 is electrically connected to a data driving circuit 50, which may be a driver chip or a flexible printed circuit board bonded on the driver board.

In each refresh cycle, the data control lines 30 sequentially output enable signals, and the data switches 14 connected to one data control line 30 are simultaneously turned on by the enable signal on the one data control line 30. The process of driving the circuit rows 10H row by row using the data control lines 30 is completed in one refresh cycle. With reference to FIG. 2 and FIG. 7, it can be understood that for one driver circuit 10 in one refresh cycle, the data switch 14 of the driver circuit 10 is turned on once to write the data voltage to one pixel electrode 11 of the driver circuit 10. The process of writing data voltages to the N pixel electrodes 11 in the driver circuit 10 is completed by N refresh cycles.

In some embodiments, the N gating signal lines 40 in the gating line group 40Z are a first gating signal line 40-1, a second gating signal line 40-2, . . . , and an $N^{th}$ gating signal line 40-N. The driver board includes a plurality of gating line groups 40Z, and a plurality of $i^{th}$ gating signal lines 40-$i$ in the plurality of gating line groups 40Z are electrically connected with each other, where i is a positive integer, and $1 \le i \le N$.

Figure 10:
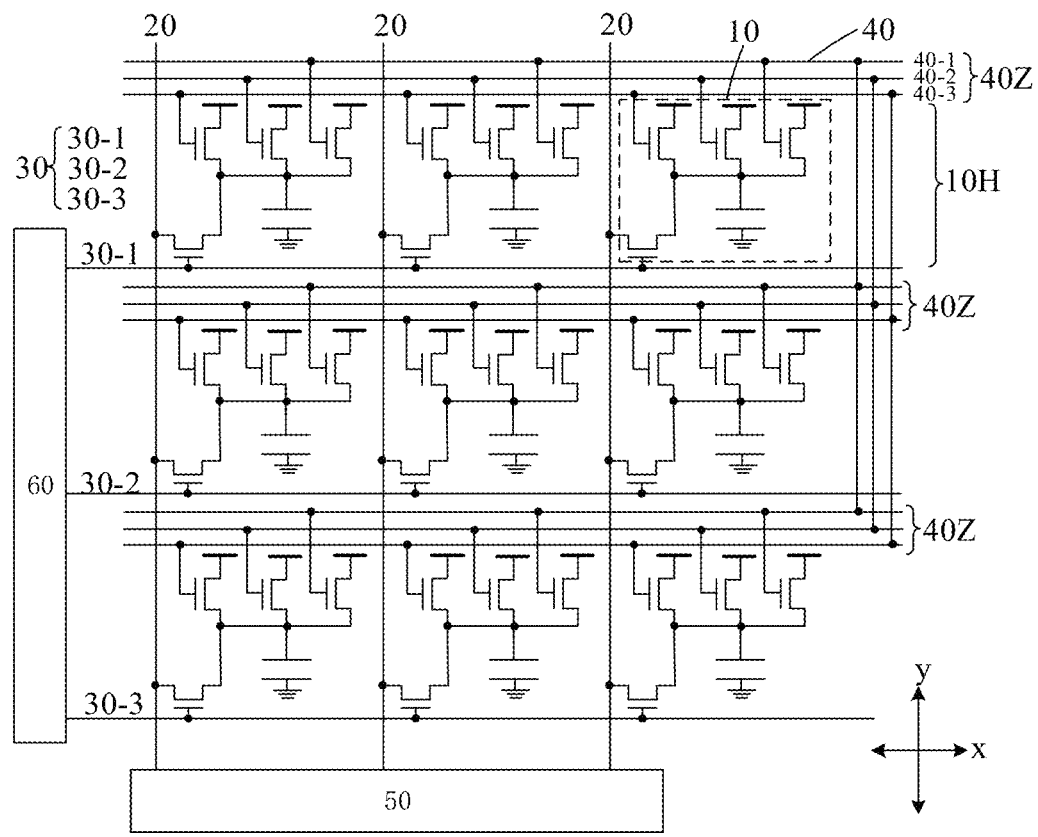
FIG. 10 is a schematic circuit diagram of another driver board according to an embodiment of the present disclosure.

FIG. 10 is a schematic circuit diagram of another driver board according to an embodiment of the present disclosure. As shown in FIG. 10, N=3, and the gating line group 40Z includes a first gating signal line 40-1, a second gating signal line 40-2, and a third gating signal line 40-3. In these gating line groups 40Z, a plurality of first gating signal lines 40-1 are electrically connected with each other, a plurality of second gating signal lines 40-2 are electrically connected with each other, and a plurality of third gating signal lines 40-3 are electrically connected with each other. The gating line groups 40Z can share the gating signal in one refresh cycle, which can reduce the quantity of gating signal required for the driver board, thereby reducing the quantity of pins of the driver chip. This is beneficial to reducing the cost.

In some embodiments, the N gating signal lines 40 provide enable signals in the N refresh cycles respectively. A duration of each refresh cycle is t, and the duration of the enable signal on each gating signal line 40 is t. In each refresh cycle, the data control lines 30 provide enable signals row by row, and the turn-on duration of the data switch 14 is far shorter than the refresh cycle t. The gating signal line 40 controls the turn-on duration of the pixel switch 13 to be equal to the duration t of the refresh cycle. In the refresh cycle, the pixel electrode 11 is still electrically connected to the storage capacitor 12 after the data switch 14 is turned off, and the storage capacitor 12 can maintain the voltage on the pixel electrode 11 to ensure that the pixel electrode 11 is fully charged. When the driver board is applied to electronic paper products, the electrophoretic particles can be fully driven by the fully charged pixel electrode 11, thereby avoiding uneven display.

Figure 11:
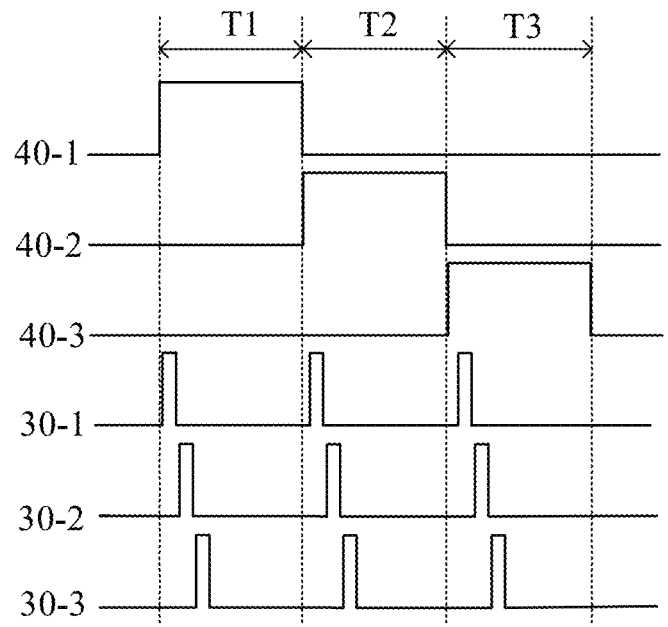
FIG. 11 is another drive timing diagram according to an embodiment of the present disclosure.

FIG. 11 is another drive timing diagram according to an embodiment of the present disclosure. For example, N=3, a display period of an image includes three refresh cycles: T1, T2, and T3. The driving method of the driver board in the refresh cycles is described with reference to FIG. 10. The duration of one enable signal provided by the gating signal line 40 is the same as the duration of refresh cycle. Take the first refresh cycle T1 as an example. In the first refresh cycle T1, the first gating signal line 40-1 provides the enable signal to turn on the pixel switch 13 connected to the first gating signal line 40-1, and the duration of the enable signal provided by the first gating signal line 40-1 is the same as the duration of the first refresh cycle T1. The data control lines 30 provide enable signals row by row, and one data control line 30 controls the data switches 14 in one circuit row 10H to be turned on simultaneously. Since the gating line groups 40Z share the gating signal, the pixel switches 13 connected to the first gating signal lines 40-1 in all circuit rows 10H are all in the turned-on state. The data voltage is written to the pixel electrode 11 by the data line 20 when the data switch 14 is turned on, and the voltage on the pixel electrode 11 is maintained by the storage capacitor 12 after the data switch 14 is turned off. During the period when the first gating signal lines 40-1 provide the gating signal once, the data control lines 30 provide the enable signals row by row, and data voltages are written row by row through the data line 20 to the pixel electrodes 11 in the circuit rows 10H. For one driver circuit 10, only one pixel switch 13 is turned on in one refresh cycle. Then after the data switch 14 is turned off, the storage capacitor 12 is still electrically connected to the pixel electrode 11, and the voltage on the pixel electrode 11 is maintained by the storage capacitor 12 to ensure that the pixel electrode 11 is fully charged.

In this embodiment of the present disclosure, the refresh cycle includes a data writing phase. In the data writing phase, the data switch 14 is turned on, and the data voltage is written to the pixel electrode 11 through the data line 20. The period during which the gating signal line 40 provides the enable signal covers the data writing phase. The data writing phase is a phase, in which data control lines 30 provide enable signals row by row, in the refresh cycle. The duration of one enable signal provided by the gating signal line 40 is the same as the duration of the refresh cycle. FIG. 11 illustrates an example embodiment in which three gating signal lines sequentially providing the enable signal in one refresh cycle. As shown in FIG. 11, in one refresh cycle, the period in which the gating signal line 40 provides the enable signal covers the data writing phase, such that a plurality of circuit rows 10H can share the gating signal, and the data writing process for the plurality of circuit rows 10H is completed in the period when the gating signal lines 40 provide the enable signal in each refresh cycle.

Figure 12:
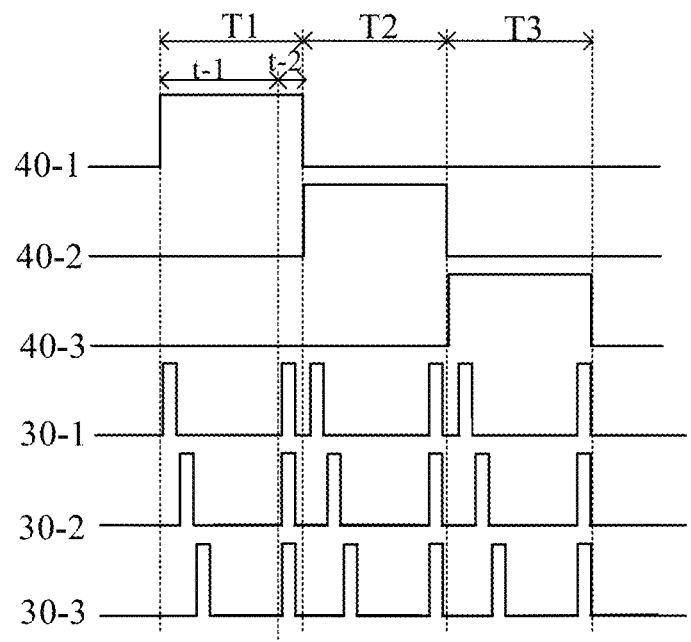
FIG. 12 is another drive timing diagram according to an embodiment of the present disclosure.

FIG. 12 is a schematic diagram of another drive timing diagram according to an embodiment of the present disclosure. For example, N=3. The driver board provided in FIG. 10 may be driven with the timing shown in FIG. 12. As shown in FIG. 12, display of a frame of image includes three refresh cycles, namely, a first refresh cycle T1, a second refresh cycle T2, and a third refresh cycle T3. Each refresh cycle includes a data writing phase t-1 and a reset phase t-2. In the data writing phase t-1, a plurality of data control lines 30 sequentially output enable signals, and data lines 20 write data voltages into corresponding pixel electrodes 11. In the reset phase t-2, the data control lines 30 simultaneously output the enable signals, data switches 14 are turned on, and the data lines 20 write a reset voltage into the corresponding pixel electrodes 11. As shown in FIG. 12, the first data control line 30-1, the second data control line 30-2, and the third data control line 30-3 sequentially output the enable signal in the data writing phase t-1, whereas the first data control line 30-1, the second data control line 30-2, and the third data control line 30-3 simultaneously output the enable signal in the reset phase t-2. In this embodiment, the reset phase t-2 is added in the refresh cycle. After the data writing phase t-1, the pixel electrode 11 is reset by the reset voltage, so as to ensure that there is no voltage difference between the pixel electrode 11 and the common electrode after the refresh cycle ends and the pixel switch 13 is turned off. The electrophoretic particles in the pixel can maintain the position where the electrophoretic particles arrive when the pixel electrode 11 is charged, thereby keeping the target display grayscale of the pixel and avoiding abnormal pixel display caused by the chaotic movement of the electrophoretic particles. In addition, in the reset phase t-2, the plurality of data control lines 30 simultaneously output the enable signal, that is, the pixel electrodes 11 in the circuit rows 10H are reset at the same time in the refresh cycle, such that the duration of the reset phase t-2 in the refresh cycle is relatively short, and the added reset phase t-2 has little impact on the refresh cycle, thereby reducing the impact on the display refresh rate.

In addition, in the refresh cycle, the duration of the enable signal provided by the gating signal line 40 covers the data writing phase t-1 and the reset phase t-2. For example, as shown in FIG. 12, in the first refresh cycle T1, the first gating signal line 40-1 provides the enable signal, and the duration of the enable signal provided by the first gating signal line 40-1 covers the data writing phase t-1 and the reset phase t-2. Therefore, the plurality of circuit rows 10H can share the gating signal. In one refresh cycle, the data writing process for the plurality of circuit rows 10H and the resetting process for the pixel electrodes 11 are completed in the period in which the gating signal lines 40 provide the enable signal. During application, after the data voltage is written into the pixel electrode 11, an electric field is formed between the pixel electrode 11 and the common electrode to control the electrophoretic particles in the pixel to move to the target position, and then the pixel electrode 11 is reset by the reset voltage. When the reset voltage is equal to the voltage of the common electrode, the position of the electrophoretic particles in the pixel does not change, to prevent abnormal pixel display caused by chaotic movement of the electrophoretic particles after the refresh cycle.

In some embodiments, taking FIG. 1 as an example, FIG. 1 is a top view of a driver board. It can be understood that the top view direction is parallel to the thickness direction of the driver board. FIG. 1 shows the driver circuit 10 including three pixel electrodes 11 and one storage capacitor 12. In the thickness direction of the driver board, the pixel electrode 11 overlaps with the pixel switch 13 connected to the pixel electrode 11, and the storage capacitor 12 partially overlaps with the three pixel electrodes 11. When applied to electronic paper products, the pixel electrode 11 need to be opposed to the common electrode to form an electric field. Therefore, the pixel electrodes 11 of the driver board are arranged in a plane. The storage capacitor 12 partially overlaps with the N pixel electrodes 11 respectively, that is, the storage capacitor 12 is disposed in the space in which the N pixel electrodes 11 are arranged, such that the space for arranging the storage capacitor 12 is larger, thereby meeting the capacitance requirements of electronic paper products on the storage capacitor 12. In addition, the pixel switch 13 overlaps with the pixel electrode 11. This ensures that the pixel switch 13 can meet the size requirements in electronic paper products, the pixel switch 13 can withstand a high voltage, and the off-state leakage current is reduced. This can stabilize the voltage on the pixel electrode 11.

In some embodiments, the N pixel electrodes 11 in the driver circuit 10 are arranged along the first direction x, and electrodes of the storage capacitor 12 extend along the first direction x. For example, N=3. As shown in FIG. 1, three pixel electrodes 11 in the driver circuit 10 are arranged along the first direction x, and both the reference electrode 121 and the counter electrode 122 of the storage capacitor 12 extend along the first direction x, such that the electrodes of the storage capacitor 12 can have a longer length in the first direction x. This can increase the electrode area and capacitance value of the storage capacitor 12 and meet the requirements on the capacitance value of the storage capacitor 12.

As shown in FIG. 1, gating signal lines 40, data control lines 30, and data lines 20 are provided in the driver board. The gating signal line 40 and the data control line 30 extend along the first direction x, and the data line 20 extends along the second direction y. The data line 20 and the data control line 30 cross each other to define the region of the driver circuit 10. A part of the gating signal line 40 is reused as the gate of the pixel switch 13, and the pixel switch 13 overlaps with the pixel electrode 11, such that the gating signal line 40 partially overlaps with the pixel electrode 11. FIG. 1 further shows a first conductive via V1 through which the pixel switch 13 is connected to the pixel electrode 11.

Figure 13:
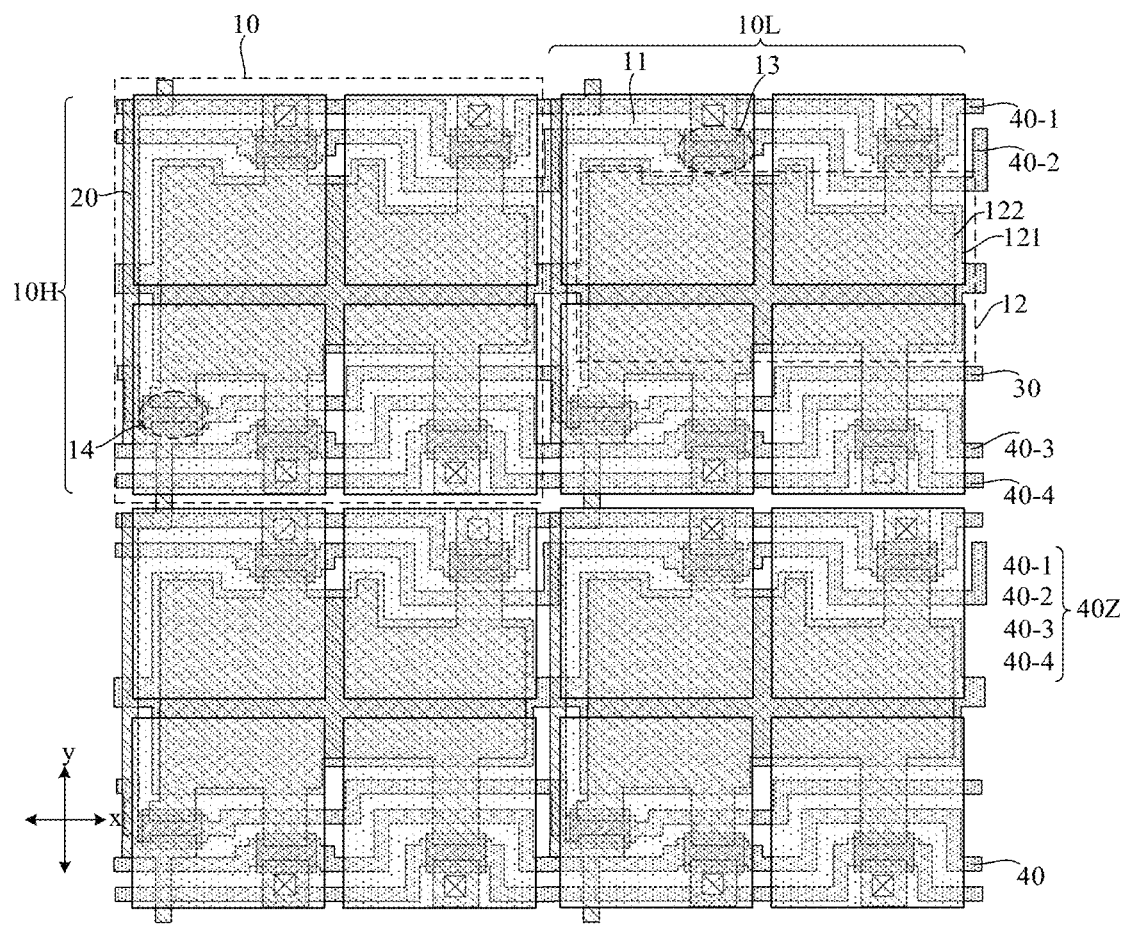
FIG. 13 is a schematic diagram of another driver board according to an embodiment of the present disclosure.
Figure 14:
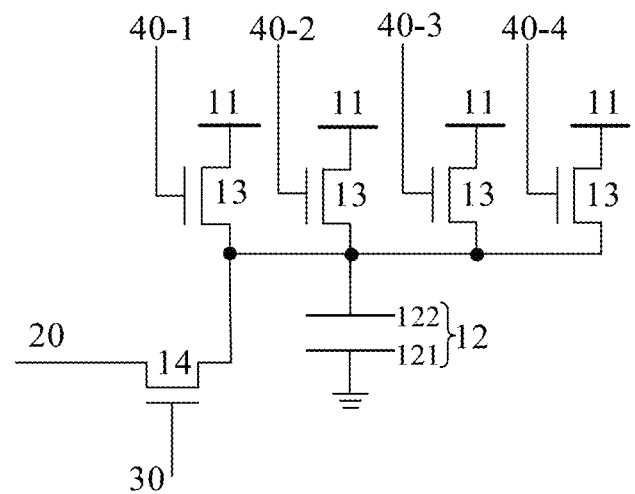
FIG. 14 is a schematic circuit diagram of a driver circuit in FIG. 13.

FIG. 13 is a schematic diagram of another driver board according to an embodiment of the present disclosure. FIG. 14 is a schematic circuit diagram of a driver circuit in FIG. 13. FIG. 13 schematically shows four driver circuits 10 in the driver board. As shown in FIG. 13, N=4, and four pixel electrodes 11 in the driver circuit 10 are arranged in two rows and two columns. Gating signal lines 40 and data control lines 30 extending in the first direction x, and data lines 20 extending in the second direction y are arranged in the driver board. Four pixel electrodes 11 in the driver circuit 10 are connected to the storage capacitor 12 through the pixel switches 13 respectively, the data line 20 is connected to the storage capacitor 12 through the data switch 14, and the pixel switches 13 are controlled by the gating signal lines 40 respectively. In the driver board, the plurality of driver circuits 10 are arranged in circuit rows 10H along the first direction x and in circuit columns 10L along the second direction y.

When N=4, one circuit row 10H is driven by four gating signal lines 40, and four gating signal lines 40 form a gating line group 40Z. With reference to FIG. 14, control terminals of four pixel switches 13 in the driver circuit 10 are respectively connected to a first gating signal line 40-1, a second gating signal line 40-2, a third gating signal line 40-3, and a fourth gating signal line 40-4 in the gating line group 40Z.

In this embodiment, displaying of an image includes four refresh cycles, and data voltages are written to the four pixel electrodes 11 in the four refresh cycles respectively. In each refresh cycle, the data switch 14 is turned on to connect the data line 20 to the counter electrode 122, one of the pixel switches 13 is turned on to connect the corresponding pixel electrode 11 to the counter electrode 122, and the data line 20 writes the data voltage into the corresponding pixel electrode 11. During the period in which the pixel switch 13 is turned on, the storage capacitor 12 maintains the voltage on the pixel electrode 11. In the four refresh cycles, data voltages are written to the four pixel electrodes 11 in the driver circuit 10 respectively. All the four pixel electrodes 11 participate in the display process, and the driver board performs driving of display of a complete image through the four refresh cycles.

In the embodiment of FIG. 13, the plurality of gating line groups 40Z share the gating signal, that is, a plurality of $i^{th}$ gating signal lines 40-$i$ in the plurality of gating line groups 40Z are electrically connected with each other, where i is a positive integer, and $1 \le i \le N$. The driving mode in the timing diagram of FIG. 11 can be applied to the driver board provided in the embodiment of FIG. 13. Displaying of an image includes four refresh cycles. For example, in the first refresh cycle, the first gating signal line 40-1 provides an enable signal to turn on the connected pixel switch 13. The duration of the enable signal of the first gating signal line 40-1 is the same as the duration of the first refresh cycle. Since the gating line groups 40Z share the gating signal, the pixel switches 13 connected to the first gating signal lines 40-1 in all circuit rows 10H are all in the turned-on state. When the first gating signal lines 40-1 provide the enable signal, the data control lines 30 provide the enable signals one by one. One data control line 30 controls the data switches 14 in one circuit row 10H to be simultaneously turned on. When the data switches 14 are turned on, the data voltages are written to the pixel electrodes 11 by the data lines 20, and the storage capacitors 12 maintains the voltages on the pixel electrodes 11 after the data switches 14 are turned off. During the period when the first gating signal lines 40-1 provide the enable signal once, the data control lines 30 provide the enable signals one by one, and data voltages are written row by row through the data line 20 to the pixel electrodes 11 in the circuit rows 10H. After four refresh cycles, data voltages are written to the four pixel electrodes 11 in all driver circuits 10 in the driver board.

During the period when the gating signal lines provide the enable signal once, the process in which the data control lines 30 provide the enable signals to write the data voltages to the circuit rows 10H row by row is the data writing phase.

The driving mode in the timing diagram of FIG. 12 can also be applied to the driver board provided in the embodiment of FIG. 13, that is, a refresh cycle includes a data writing phase and a reset phase. In the reset phase, the plurality of data control lines 30 simultaneously output enable signals to reset the pixel electrodes 11. It can be understood with reference to the embodiments of FIG. 1 and FIG. 12 above, and details are not repeated herein.

In an embodiment, the display panel includes the driver board provided in the embodiment of FIG. 13. The pixels of the display panel include red pixels, green pixels, blue pixels, and white pixels, and each pixel includes electrophoretic particles. One red pixel, one green pixel, one blue pixel, and one white pixel constitute a display unit, and one display unit corresponds to one driver circuit 10 in the driver board. That is, one pixel electrode 11 cooperates with the common electrode to drive the electrophoretic particles in the pixel to move, thus realizing pixel display. In this embodiment, the process of displaying an image by the display panel includes four refresh cycles. For example, the data voltage is written to the pixel electrode 11 corresponding to the red pixel in the first refresh cycle to drive the red pixel to display, the data voltage is written to the pixel electrode 11 corresponding to the green pixel in the second refresh cycle to drive the green pixel to display, the data voltage is written to the pixel electrode 11 corresponding to the blue pixel in the third refresh cycle to drive the blue pixel to display, and the data voltage is written to the pixel electrode 11 corresponding to the white pixel in the fourth refresh cycle to drive the white pixel to display. The image is displayed after four refresh cycles. This embodiment of the present disclosure does not limit the refresh order of pixels with different colors in the four refresh cycles.

In some embodiments, pixels of the display panel include red pixels, green pixels, blue pixels, and white pixels, and each pixel includes electrophoretic particles. The driver board in the display panel includes a plurality of driver circuits 10. Each driver circuit 10 includes four pixel electrodes 11 and one storage capacitor. The four pixel electrodes 11 in the driver circuit 10 are arranged in the same direction. One red pixel, one green pixel, one blue pixel, and one white pixel constitute a display unit, and one display unit corresponds to one driver circuit 10 in the driver board. In this embodiment, the process of displaying an image by the display panel includes four refresh cycles.

Figure 15:
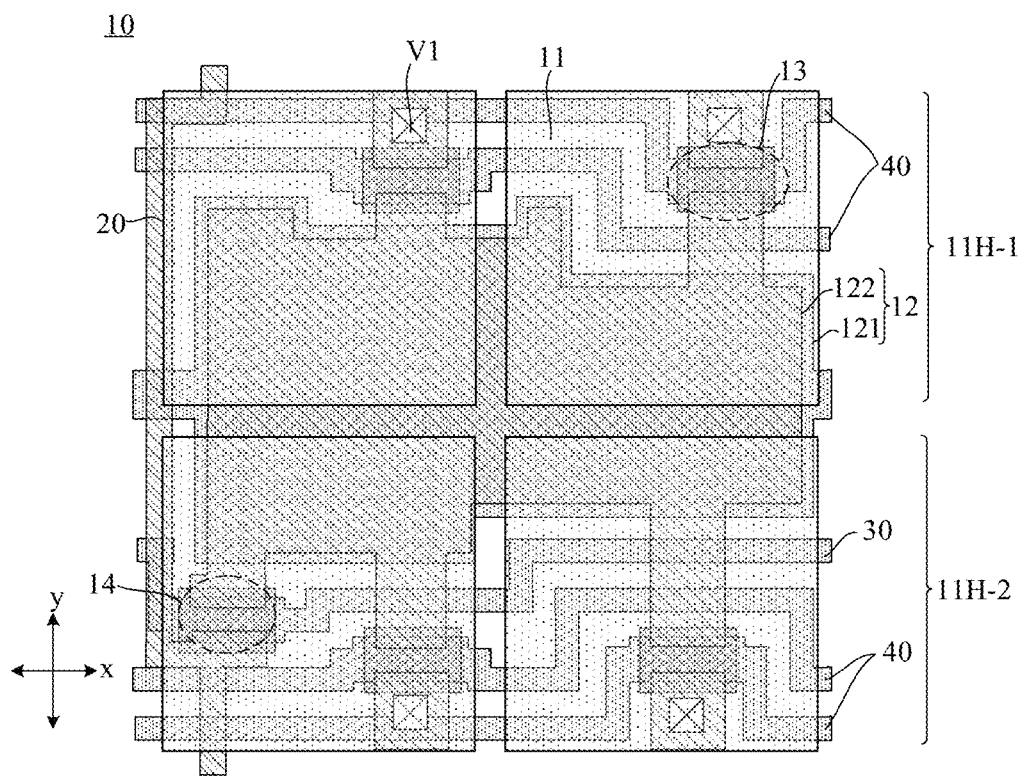
FIG. 15 is an enlarged view of a driver circuit in FIG. 13.

FIG. 15 is an enlarged view of a driver circuit in FIG. 13. As shown in FIG. 15, in a driver circuit 10, four pixel electrodes 11 are arranged in a first electrode row 11H-1 and a second electrode row 11H-2 along a first direction x. Edge portions of the two pixel electrodes 11 in the first electrode row 11H-1 adjacent to the second electrode row 11H-2 are first edge portions (not labeled with reference sign in FIG. 15), and edge portions of the two pixel electrodes 11 in the second electrode row 11H-2 adjacent to the first electrode row 11H-1 are second edge portions (not labeled with reference sign in FIG. 15). The storage capacitor 12 overlaps with the first edge portions of the two pixel electrodes 11 and the second edge portions of the two pixel electrodes 11, that is, the storage capacitor 12 overlaps with the middle region of the array formed by the four pixel electrodes 11. The driver board further includes gating signal lines 40 extending in the first direction x, a control terminal of the pixel switch 13 is connected to a corresponding gating signal line 40, and the driver circuit 10 is correspondingly connected to four gating signal lines 40. In the second direction y, two of the four gating signal lines 40 are located at one side of the storage capacitor 12 and the other two are located at the other side of the storage capacitor 12, and the second direction y crosses the first direction x. The control terminal of the data switch 14 is connected to the data control line 30, and the data control line 30 extends along the first direction x. In the second direction y, the data control line 30 is located at a side of the storage capacitor 12.

The embodiment of FIG. 15 shows that when N=4, the four pixel electrodes 11 in the driver circuit 10 are arranged in two rows and two columns, and the storage capacitor 12 is arranged in the middle region of the arrangement region of the four pixel electrodes 11, such that the storage capacitor 12 partially overlaps with each of the four pixel electrodes 11. Arranging one storage capacitor 12 within the arrangement region of the four pixel electrodes 11 can ensure that the capacitance value of the storage capacitor 12 is sufficiently large. This allows for meeting the requirements on the capacitance value of the storage capacitor 12 when applied in electronic paper products, thereby fully charging the pixel electrodes 11. This ensures efficient driving of electrophoretic particles and prevents uneven display. In addition, the four gating signal lines 40 are arranged in pairs that are located on two sides of the storage capacitor 12 respectively, which can facilitate the electrical connection between the gating signal line 40 and the pixel switch 13. Setting the data control line 30 at a side of the storage capacitor 12 facilitates the electrical connection between the data control line 30 and the data switch 14.

Figure 16:
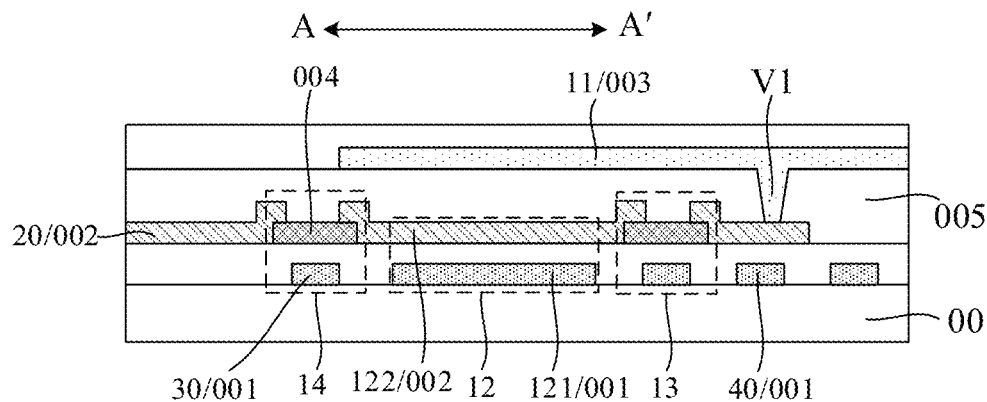
FIG. 16 is a schematic cross-sectional view taken along line A-A' in FIG. 1.

FIG. 16 is a schematic cross-sectional view taken along a line A-A' shown in FIG. 1. As shown in FIG. 16, the driver board includes a substrate 00, and a first metal layer 001, a second metal layer 002, and a transparent conductive layer 003 arranged sequentially away from the substrate 00. At least one of the gating signal lines 40, at least one of the data control lines 30, and the reference electrode 121 are located in the first metal layer 001, the data line 20 and the counter electrode 122 are located in the second metal layer 002, and the pixel electrode 11 is located in the transparent conductive layer 003. Optionally, the material of the first metal layer 001 includes molybdenum, the material of the second metal layer 002 includes titanium and aluminum, and the material of the transparent conductive layer 003 includes indium tin oxide. As shown in FIG. 16, the driver board further includes a semiconductor layer 004, and the material of the semiconductor layer 004 includes silicon. The semiconductor layer 004 is used to form active layers of switch transistors. FIG. 16 shows that active layers of the pixel switch 13 and the data switch 14 are located in the semiconductor layer 004. In FIG. 16, the pixel switch 13 and the data switch 14 are bottom-gate transistors. In other embodiments, the pixel switch 13 and the data switch 14 are top-gate transistors.

The active layers of the transistors of the present disclosure may include at least one of amorphous silicon, low-temperature polysilicon, and oxide semiconductor, and the transistors here may include the pixel switch 13 and the data switch 14. FIG. 16 illustrates the structure of a transistor prepared by an amorphous silicon process.

FIG. 16 also shows a first conductive via V1 through which the pixel electrode 11 is electrically connected to the second terminal of the pixel switch 13.

In addition, a planarization layer 005 is arranged between the transparent conductive layer 003 and the second metal layer 002. The planarization layer 005 has a planarization function, and can provide a flat base for the transparent conductive layer 003, thereby ensuring the flatness of the pixel electrode 11.

Figure 17:
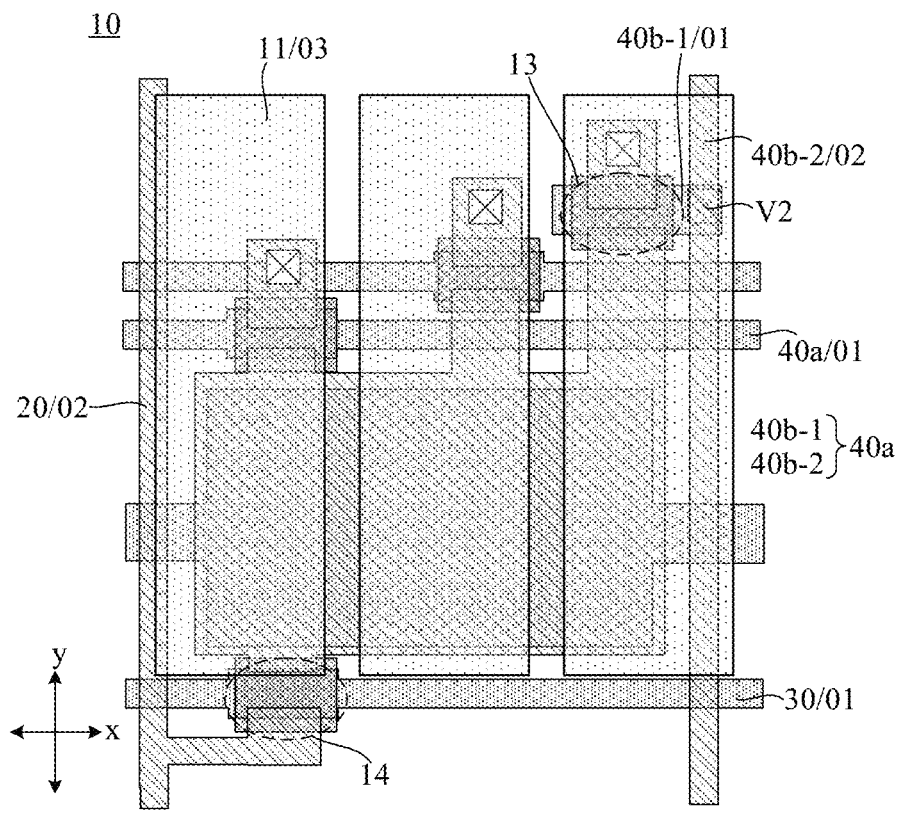
FIG. 17 is a schematic diagram of another driver board according to an embodiment of the present disclosure.

In some embodiments, at least one gating signal line 40 each includes a part located in the second metal layer 002. FIG. 17 is a schematic diagram illustrating another driver board according to an embodiment of the present disclosure. FIG. 17 merely shows one driver circuit 10 on the driver board and N=3 is used as an example. As shown in FIG. 17, three pixel electrodes 11 in the driver circuit 10 are arranged along a first direction x. The driver board includes a first-type gating signal line 40a extending along the first direction x and a second-type gating signal line 40b extending along the second direction y. The first-type gating signal line 40a is located in the first metal layer 01. The second-type gating signal line 40b includes a first line segment 40b-1 and a second line segment 40b-2. The first line segment 40b-1 is located in the first metal layer 001 and the second line segment 40b-2 is located in the second metal layer 002, and the second line segment 40b-2 is electrically connected to the first line segment 40b-1 via a second contact via V2. Part of the first line segment 40b-1 is reused as a gate of the pixel switch 13. The data line 20 is located in the second metal layer 002, the data control line 30 is located in the first metal layer 001, and the pixel electrode 11 is located in the transparent conductive layer 003. The sheet resistance of the second metal layer 002 is smaller than that of the first metal layer 001. Setting the second line segment 40b-2 of the second-type gating signal line 40b in the second metal layer 002 can reduce the overall resistance of the second-type gating signal line 40b, thus reducing the voltage drop of the signal transmitted on the second-type gating signal line 40b, which improves the in-plane signal uniformity.

In other embodiments, at least one data control line 30 each includes a third line segment and a fourth line segment, the third line segment is located in the first metal layer 001, and the fourth line segment is located in the second metal layer 002. The third line segment is electrically connected to the fourth line segment through a contact via penetrating through the insulating layer, and part of the third line segment is reused as a gate of the data switch 14. This arrangement can reduce the overall resistance of the data control line 30, thereby reducing the voltage drop of the signal transmitted on the data control line 30, which improves the in-plane signal uniformity.

Figure 18:
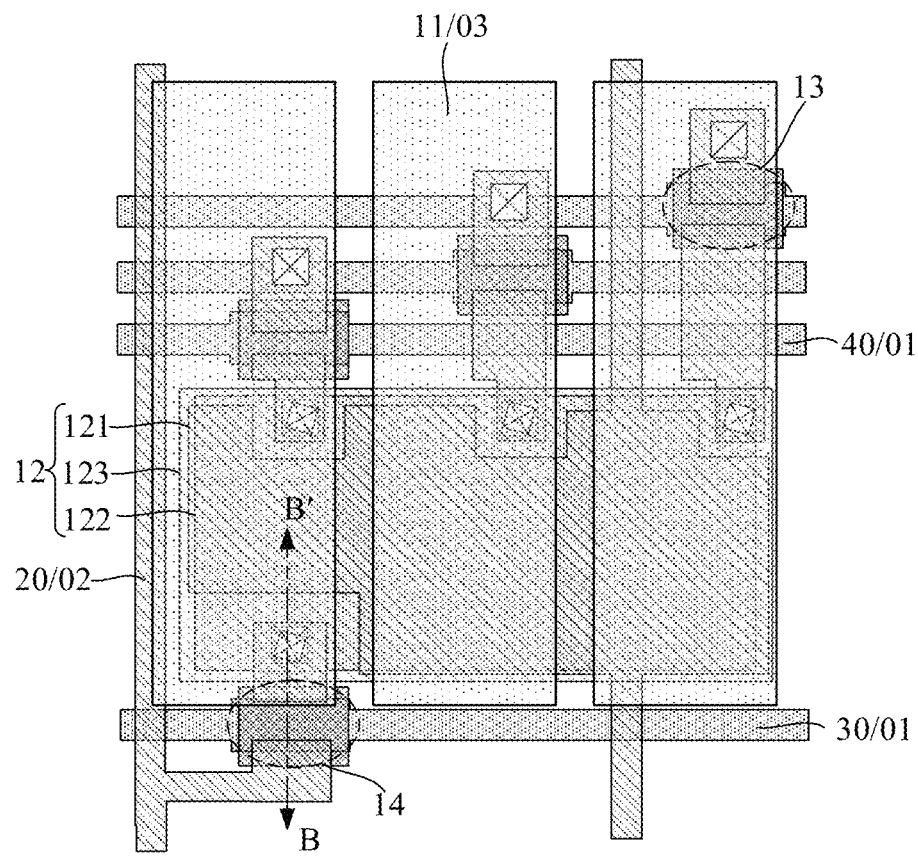
FIG. 18 is a schematic diagram of another driver board according to an embodiment of the present disclosure.
Figure 19:
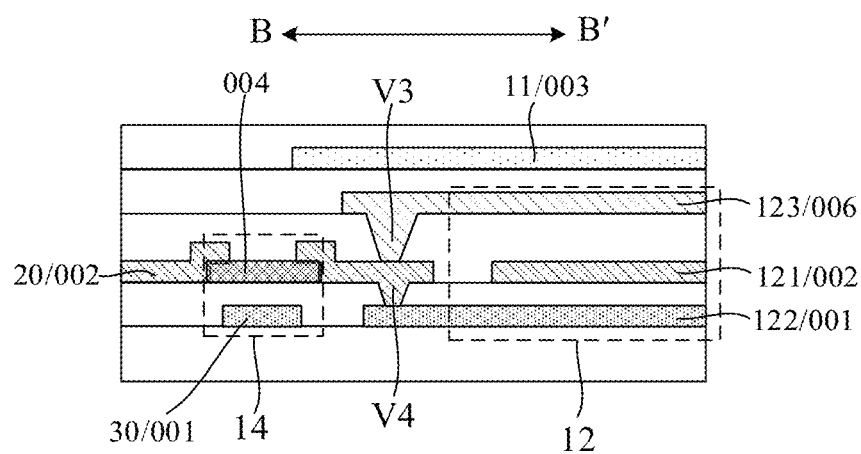
FIG. 19 is a schematic cross-sectional view taken along line B-B' in FIG. 18.

FIG. 18 is a schematic diagram of another driver board according to an embodiment of the present disclosure, and FIG. 19 is a schematic cross-sectional view taken along a line B-B' in FIG. 18. FIG. 18 schematically shows one driver circuit 10 on the driver board and N=3 is used as an example. With reference to FIG. 18 and FIG. 19, the driver board includes a gating signal line 40 and a data control line 30, a control terminal of a pixel switch 13 is connected to the gating signal line 40, and a control terminal of a data switch 14 is coupled to the data control line 30. The driver board includes a substrate 00, and a first metal layer 001, a second metal layer 002, a third metal layer 006, and a transparent conductive layer 003 arranged sequentially away from the substrate 00. Optionally, the material of the first metal layer 001 includes molybdenum, the material of the second metal layer 002 and the third metal layer 006 includes titanium and aluminum, and the material of the transparent conductive layer 003 includes indium tin oxide.

A storage capacitor 12 includes a reference electrode 121, a counter electrode 122, and a third electrode 123. The reference electrode 121 is opposite to the counter electrode 122, the third electrode 123 is opposite to the reference electrode 121, and the third electrode 123 is electrically connected to the counter electrode 122.

At least one gating signal line 40, at least one data control line 30, and the counter electrode 122 are located in the first metal layer 001, the data line 20 and the reference electrode 121 are located in the second metal layer 002, the third electrode 123 is located in the third metal layer 006, and the pixel electrode 11 is located in the transparent conductive layer 003.

As can be seen from FIG. 19, the third electrode 123 is connected to a second terminal of the data switch 14 through a third conductive via V3 penetrating through the insulating layer, and the second terminal of the data switch 14 is connected to the counter electrode 122 through a fourth conductive via V4 penetrating through the insulating layer. Thus, the electrical connection between the third electrode 123 and the counter electrode 122 is realized.

The driver board provided in this embodiment includes three metal layers, and the three electrodes of the storage capacitor 12 are respectively located in the three metal layers, such that the storage capacitor 12 forms a sandwich structure. This can increase the capacitance value of the storage capacitor 12.

In this embodiment of the present disclosure, the capacitance value of the storage capacitor 12 in the driver board is $C_0$, and $0.5\ pf \leq C_0 \leq 3\ fp$. The capacitance value of the storage capacitor 12 is not less than 0.5 pf, which can ensure that the pixel electrode 11 is fully charged in the refresh cycle, and ensure that electrophoretic particles are fully driven when applied in electronic paper products. The capacitance value of the storage capacitor 12 is not larger than 3 fp, which can avoid the excessive size of the storage capacitor 12 affecting the PPI of the electronic paper products.

In the above related embodiments, N=3 or N=4 is used as an example to illustrate the structure of the driver board, and the driving mode of the driver board in the process of displaying an image.

In other embodiments, N=2, that is, one driver circuit 10 includes two pixel electrodes 11 and one storage capacitor 12. In this embodiment, displaying of an image includes two refresh cycles. The driver board is applied to a display panel, the display panel includes red pixels, green pixels, and blue pixels, and each pixel includes a pixel electrode 11. Some driver circuits 10 each correspond to one red pixel and one green pixel, some driver circuits 10 each correspond to one red pixel and one blue pixel, and some driver circuits 10 each correspond to one green pixel and one blue pixel.

In another embodiment, the display panel includes red pixels, green pixels, blue pixels, and white pixels, and a driver circuit 10 in the driver board includes two pixel electrodes 11 and one storage capacitor 12.

In another embodiment, the display panel includes red pixels, green pixels, blue pixels, and white pixels, and a driver circuit 10 in the driver board includes three pixel electrodes 11 and one storage capacitor 12.

Figure 20:
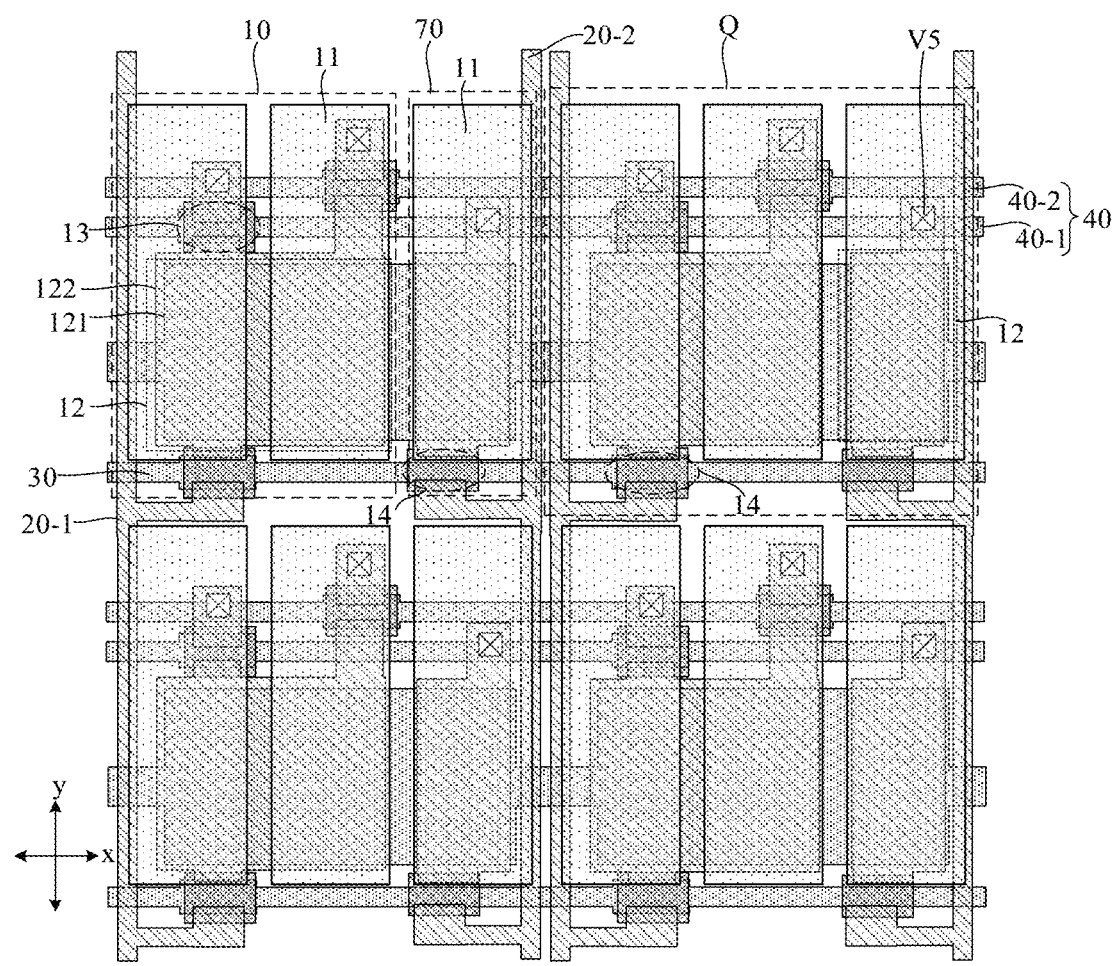
FIG. 20 is a schematic diagram of another driver board according to an embodiment of the present disclosure.
Figure 21:
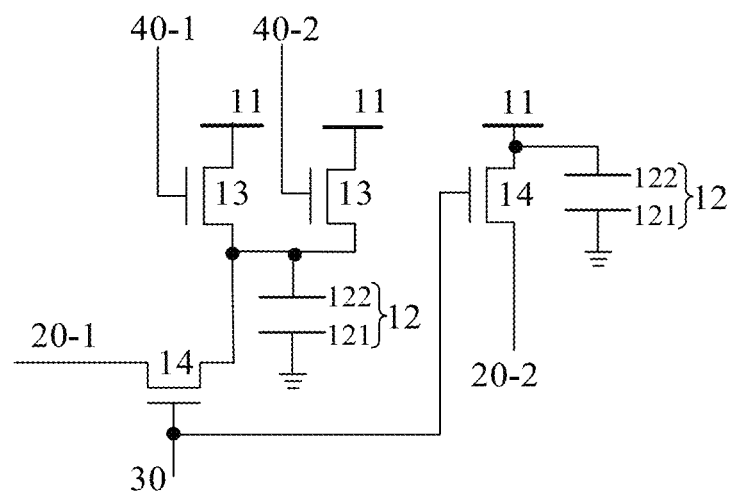
FIG. 21 is a schematic circuit diagram of a region Q in FIG. 20.

FIG. 20 is a schematic diagram of another driver board according to an embodiment of the present disclosure, and FIG. 21 is a schematic circuit diagram at a region Q in FIG. 20. As shown in FIG. 20, the driver board includes a plurality of driver circuits 10. The driver circuit 10 includes two pixel electrodes 11 and one storage capacitor 12. The pixel electrode 11 is connected to a counter electrode 122 of the storage capacitor 12 through a pixel switch 13, and a reference electrode 121 of the storage capacitor 12 is grounded. A control terminal of the pixel switch 13 is connected to a gating signal line 40. With reference to FIG. 21, two pixel switches 13 in the driver circuit 10 are respectively connected to a first gating signal line 40-1 and a second gating signal line 40-2. A first data line 20-1 is arranged in the driver board, and the first data line 20-1 is connected to the storage capacitor 12 in the driver circuit 10 through the data switch 14.

The driver board further includes a supplementary driving circuit 70 including one pixel electrode 11 and one storage capacitor 12. In the driving circuit 70, the pixel electrode 11 is electrically connected to the storage capacitor 12. FIG. 20 shows that the pixel electrode 11 is connected to the counter electrode 122 of the storage capacitor 12 through a fifth conductive via V5. A second data line 20-2 is arranged in the driver board, and the second data line 20-2 is connected to the storage capacitor 12 in the driving circuit 70 through the data switch 14.

In addition, as can be seen from FIG. 20, a control terminal of the data switch 14 in the driver circuit 10 and a control terminal of the data switch 14 in the driving circuit 70 are both connected to the data control line 30.

Figure 22:
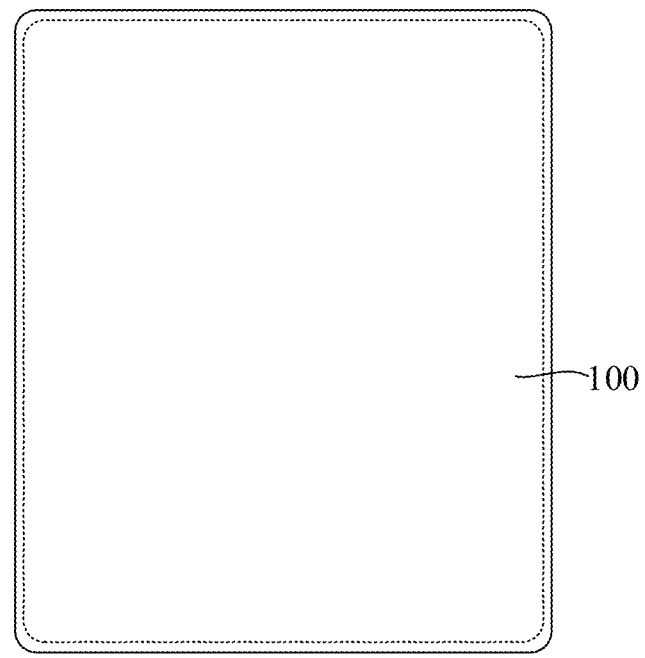
FIG. 22 is a schematic diagram of a display apparatus according to an embodiment of the present disclosure.

An embodiment of the present disclosure further provides a display apparatus. FIG. 22 is a schematic diagram of a display apparatus according to an embodiment of the present disclosure. As shown in FIG. 22, the display apparatus includes the display panel 100 provided in any embodiment of the present disclosure. The structure of the display panel 100 has been described in the foregoing embodiments, and details are not repeated. The display apparatus provided by the embodiment of the present disclosure may be an electronic product such as a smart tag, a reader, an advertising billboard.

The above descriptions are merely exemplary embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the foregoing embodiments are merely intended to describe and not to limit the technical solutions of the present disclosure. Although the present disclosure has been described in detail with reference to the foregoing embodiments, persons skilled in the art should understand that they can still make modifications to the technical solutions described in the foregoing embodiments or make equivalent replacements to some or all of the technical features thereof. These modifications or replacements do not make the essence of the corresponding technical solutions deviate from the scope of the technical solutions of the embodiments of the present disclosure.

What is claimed is:

1. A driver board, comprising:
   a driver circuit; and
   data lines,
   wherein the driver circuit comprises:
     N pixel electrodes, wherein N is a positive integer and N≥2;
     a storage capacitor comprising a reference electrode and a counter electrode;
     a data switch; and
     N pixel switches,
   wherein the counter electrode is connected to one of the data lines through the data switch,
   each pixel electrode is connected to the counter electrode via one of the N pixel switches, and
   each pixel switch comprises a control terminal configured for receiving a gating signal.

2. The driver board according to claim 1, wherein displaying of an image comprises N refresh cycles, and data voltages are written into the N pixel electrodes in the N refresh cycles respectively, and
   in each refresh cycle, the data switch is turned on to connect the data line to the counter electrode, the pixel switch corresponding to the refresh cycle is turned on to connect the pixel electrode corresponding to the refresh cycle to the counter electrode, and the data line writes the data voltage corresponding to the refresh cycle into the pixel electrode corresponding to the refresh cycle.

3. The driver board according to claim 2, wherein each refresh cycle comprises a data writing phase and a reset phase,
   in the data writing phase, the pixel electrode receives the data voltage from the data line, and
   in the reset phase, the pixel electrode receives a reset voltage from the data line.

4. The driver board according to claim 1, further comprising data control lines, wherein the data switch comprises a first terminal, a second terminal, and a control terminal, the first terminal is connected to the one of the data lines, and the second terminal is connected to the counter electrode,
   the driver circuit comprises a plurality of driver circuits arranged in circuit rows and circuit columns, the control terminals of the data switches of the driver circuits in a same circuit row are connected to a same data control line of the data control lines, and the data switches in a same circuit column are electrically connected to a same data line of the data lines, and
   displaying of an image comprises N refresh cycles, and in each refresh cycle, the data control lines sequentially output an enable signal, and the data switches electrically connected to the same data control line are simultaneously turned on by the enable signal.

5. The driver board according to claim 4, wherein each refresh cycle comprises a data writing phase and a reset phase,
   in the data writing phase, the data control lines sequentially output the enable signal, and
   in the reset phase, the data control lines simultaneously output the enable signal, the data switches of the plurality of driver circuits are turned on, and the data lines write a reset voltage into the pixel electrodes, corresponding to a refresh cycle of the plurality of driver circuits.

6. The driver board according to claim 1, further comprising a plurality of gating line groups, wherein the driver circuit comprises a plurality of driver circuits arranged in circuit rows and circuit columns, and each gating line group comprises N gating signal lines,
   the driver circuits in a same circuit row share a same gating line group, and control terminals of the N pixel switches in each driver circuit in the same circuit row are respectively connected to the N gating signal lines of the same gating line group.

7. The driver board according to claim 6, wherein the N gating signal lines in each gating line group comprise a first gating signal line to an $N^{th}$ gating signal line, and
   the $i^{th}$ gating signal lines in the plurality of gating line groups are electrically connected with each other, wherein i is a positive integer, and 1≤i≤N.

8. The driver board according to claim 6, wherein displaying of an image comprises N refresh cycles, and the N gating signal lines provide an enable signal in the N refresh cycles respectively, and wherein a duration of the refresh cycle is equal to a duration of the enable signal provided by the gating signal line in the refresh cycle, and
   wherein each refresh cycle comprises a data writing phase, and in the data writing phase, the data line writes a data voltage into the pixel electrode, and a duration of the enable signal provided by the gating signal line covers the data writing phase, or wherein each refresh cycle comprises a data writing phase and a reset phase, the data line writes a data voltage into the pixel electrode in the data writing phase, the data line writes a reset voltage into the pixel electrode in the reset phase, and a duration of the enable signal provided by the gating signal line covers the data writing phase and the reset phase.

9. The driver board according to claim 1, wherein in a thickness direction of the driver board, the pixel electrode overlaps with the pixel switch connected to the pixel electrode, and the storage capacitor partially overlaps with each of the N pixel electrodes.

10. The driver board according to claim 9, wherein the N pixel electrodes in the driver circuit are arranged along a first direction, and electrodes of the storage capacitor extend along the first direction.

11. The driver board according to claim 9, wherein N=4, and the four pixel electrodes are arranged in two rows and two columns.

12. The driver board according to claim 11, wherein the four pixel electrodes are arranged in a first electrode row and a second electrode row, the first electrode row and the second electrode row extend along the first direction, edge portions of the two pixel electrodes in the first electrode row adjacent to the second electrode row are first edge portions, and edge portions of the two pixel electrodes in the second electrode row adjacent to the first electrode row are second edge portions,
- the storage capacitor overlaps the first edge portions of the two pixel electrodes in the first electrode row and the second edge portions of the two pixel electrodes in the second electrode row,
- the driver board further comprises gating signal lines extend along the first direction, and data control lines extend along the first direction,
- the control terminal of the pixel switch is connected to one of the gating signal lines, the driver circuit is connected to four gating signal lines of the gating signal lines, and the control terminal of the data switch is connected to one of the data control lines
- in a second direction, two of the four gating signal lines are located at one side of the storage capacitor and the other two of the four gating signal lines are located at the other side of the storage capacitor, and the second direction crosses the first direction, and
- in the second direction, the data control line is located at a side of the storage capacitor.

13. The driver board according to claim 1, further comprising gating signal lines and data control lines, wherein the control terminal of the pixel switch is connected to one of the gating signal lines, and a control terminal of the data switch connected to one of the data control lines,
- the driver board further comprises a substrate, and a first metal layer, a second metal layer, and a transparent conductive layer arranged sequentially in a direction away from the substrate, and
- at least part of a gating signal line of the gating signal lines, at least part of a data control line of the data control lines, and the reference electrode are located in the first metal layer, the data line and the counter electrode are located in the second metal layer, and the pixel electrode is located in the transparent conductive layer.

14. The driver board according to claim 13, wherein at least one of the gating signal lines each comprises a first line segment and a second line segment, the first line segment is located in the first metal layer, and the second line segment is located in the second metal layer; and/or
- at least one of the data control lines each comprises a third line segment and a fourth line segment, the third line segment is located in the first metal layer, and the fourth line segment is located in the second metal layer.

15. The driver board according to claim 1, further comprising gating signal lines and data control lines, wherein the control terminal of the pixel switch is connected to one of the gating signal lines, and a control terminal of the data switch is connected to one of the data control lines,
- the driver board further comprises a substrate, and a first metal layer, a second metal layer, a third metal layer, and a transparent conductive layer arranged sequentially in a direction away from the substrate,
- the storage capacitor further comprises a third electrode opposite to the reference electrode and electrically connected to the counter electrode, and
- at least part of a gating signal line of the gating signal lines, at least part of a data control line of the data control lines, and the counter electrode are located in the first metal layer, the data line and the reference electrode are located in the second metal layer, the third electrode is located in the third metal layer, and the pixel electrode is located in the transparent conductive layer.

16. The driver board according to claim 1, wherein a capacitance value of the storage capacitor is $C_0$, and $0.5\ \text{pf} \leq C_0 \leq 3\ \text{fp}$.

17. A display panel, comprising a driver board, wherein the driver board comprises:
- a driver circuit; and
- data lines,
- wherein the driver circuit comprises:
  - N pixel electrodes, wherein N is a positive integer and $N \geq 2$;
  - a storage capacitor comprising a reference electrode and a counter electrode;
  - a data switch; and
  - N pixel switches,
- wherein the counter electrode is connected to one of the data lines through the data switch,
- each pixel electrode is connected to the counter electrode via one of the N pixel switches, and
- each pixel switch comprises a control terminal configured for receiving a gating signal.

18. The display panel according to claim 17, further comprising a display medium and a counter substrate, and the display medium being located between the driver board and the counter substrate,
- wherein the driver circuit comprises a plurality of driver circuits, and the counter substrate comprises a common electrode that overlaps the pixel electrodes of the plurality of driver circuits along a thickness direction of the display panel.

19. The display panel according to claim 18, wherein the counter substrate further comprises a color filter layer, and the color filter layer comprises at least three color filter units with different colors,
- in the thickness direction of the display panel, each color filter unit overlaps with one of the pixel electrodes of the plurality of driver circuits, and
- N color filter units of the color filter units overlapping with the N pixel electrodes in the driver circuit have different colors.

20. A display apparatus, comprising a display panel, wherein the display panel comprises a driver board, and the driver board comprises a driver circuit and data lines,
- wherein the driver circuit comprises:
  - N pixel electrodes, wherein N is a positive integer and $N \geq 2$;
  - a storage capacitor comprising a reference electrode and a counter electrode;
  - a data switch; and
  - N pixel switches,
- wherein the counter electrode is connected to one of the data lines through the data switch,
- each pixel electrode is connected to the counter electrode via one of the N pixel switches, and
- each pixel switch comprises a control terminal configured for receiving a gating signal.

* * * * *